(12) United States Patent
Yamaguchi et al.

(10) Patent No.: US 10,417,835 B2
(45) Date of Patent: Sep. 17, 2019

(54) TOLL COLLECTION SYSTEM AND SOUNDNESS DETERMINATION METHOD

(71) Applicant: MITSUBISHI HEAVY INDUSTRIES MACHINERY SYSTEMS, LTD., Kobe-shi, Hyogo (JP)

(72) Inventors: Yasuhiro Yamaguchi, Tokyo (JP); Kenta Nakao, Tokyo (JP); Hiroyuki Nakayama, Tokyo (JP)

(73) Assignee: MITSUBISHI HEAVY INDUSTRIES MACHINERY SYSTEMS, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 16/072,095

(22) PCT Filed: Feb. 26, 2016

(86) PCT No.: PCT/JP2016/055869
§ 371 (c)(1),
(2) Date: Jul. 23, 2018

(87) PCT Pub. No.: WO2017/145372
PCT Pub. Date: Aug. 31, 2017

(65) Prior Publication Data
US 2019/0035168 A1   Jan. 31, 2019

(51) Int. Cl.
*G07B 15/06*   (2011.01)
*G06F 17/18*   (2006.01)
*G08G 1/017*   (2006.01)

(52) U.S. Cl.
CPC ........... *G07B 15/063* (2013.01); *G06F 17/18* (2013.01); *G08G 1/017* (2013.01)

(58) Field of Classification Search
CPC ...... G07B 15/00; G07B 15/06; G07B 15/063; G08G 1/00; G08G 1/017; G06F 17/18
(Continued)

(56) References Cited

U.S. PATENT DOCUMENTS 5,974,397 A * 10/1999 Olsson ................. G07B 15/063
235/384
6,342,844 B1 * 1/2002 Rozin .................. G07B 15/063
340/928

(Continued)

FOREIGN PATENT DOCUMENTS

JP   H02-230458 A   9/1990
JP   H05-274187 A   10/1993
(Continued)

OTHER PUBLICATIONS

PCT/ISA/210, "International Search Report for International Application No. PCT/JP2016/055869," dated May 31, 2016.
(Continued)

*Primary Examiner* — Hung T Nguyen
(74) *Attorney, Agent, or Firm* — Manabu Kanesaka; Benjamin Hauptman; Kenneth Berner

(57) ABSTRACT

A toll collection system includes a roadside antenna wirelessly communicating with an on-board device mounted in a vehicle; a communication processing unit for carrying out predetermined communication processing with the on-board device via the roadside antenna; a communication control unit for acquiring the results of communication processing from the communication processing unit and creating information for toll collection; and a toll collection processing unit for accepting the input of the information for toll collection from the communication control unit and carrying out toll collection processing based on this information. When a first component, being one part configuring any communication pair, accepts the input of a confirmation signal, the first component outputs a response signal, and a second component, being the other part, outputs the confirmation signal to the first component and determines whether
(Continued)

the first component is operating normally based on whether the input of the response signal is accepted.

9 Claims, 21 Drawing Sheets

(58) Field of Classification Search
USPC ........ 340/539.1, 928, 933; 235/384; 342/54; 705/13
See application file for complete search history.

(56) References Cited

U.S. PATENT DOCUMENTS

| 9,495,867 B2 * | 11/2016 | Korenaga | G08G 1/0116 |
| 2002/0145542 A1 * | 10/2002 | Yamashita | G07B 15/063 340/935 |
| 2009/0121898 A1 * | 5/2009 | Jia | G07B 15/063 340/928 |

FOREIGN PATENT DOCUMENTS

| JP | 2003-283403 A | 10/2003 |
| JP | 2005-085046 A | 3/2005 |

OTHER PUBLICATIONS

PCT/ISA/237 "Written Opinion of the International Searching Authority for International Application No. PCT/JP2016/055869," dated May 31, 2016.

* cited by examiner

TOLL COLLECTION SYSTEM AND SOUNDNESS DETERMINATION METHOD

RELATED APPLICATIONS

The present application is National Phase of International Application No. PCT/JP2016/055869 filed Feb. 26, 2016, the disclosure of which is hereby incorporated by reference herein in its entirety.

TECHNICAL FIELD

The present invention relates to a toll collection system and a soundness determination method.

BACKGROUND ART

Generally, an electronic toll collection system (ETC: Electronic Toll Collection System (trade name), also referred to as an "automatic toll collection system") is installed in toll gates with a start controller, and the like disposed therein. In contrast, the introduction of a free flow type electronic toll collection system for carrying out non-stop toll collection on vehicles driving on the main line of an expressway has recently been researched (for example, refer to Patent Document 1).

Upon entering existing toll gates, a user must normally decelerate, temporarily stop a vehicle, or the like. However, with a free flow type electronic toll collection system, a user need not decelerate, temporarily stop, a vehicle, or the like but rather allow communication between an on-board device and roadside equipment mounted on the vehicle simply by passing under a gantry at normal driving speed. Thereby, the effect of relieving traffic congestion, and the like is expected, further enhancing the convenience of expressways.

CITATION LIST

Patent Document

Patent Document 1: JP 2005-085046 A

SUMMARY OF INVENTION

Problem to be Solved by the Invention

In the abovementioned toll collection system, information for toll collection necessary for collecting tolls from each user (personal contract information, vehicle type information, and the like of an IC card) is generally acquired via communication between the on-board device and roadside equipment. Here, in a case where a period during which information for toll collection is not acquired continues in the toll collection system, a monitoring person of the toll collection system, and the like cannot immediately determine during the period whether vehicles have actually not passed or vehicles have passed but some abnormality in the system has prevented information for toll collection from being acquired.

It is contemplated that in the case of a free flow type toll collection system, in a case where the discovery and recovery of abnormalities is delayed, a large number of vehicles may pass during this time without being subjected to regular toll collection processing, thereby causing a great operational disadvantage.

In view of the abovementioned problems, the present invention provides a free flow type toll collection system which can detect abnormalities, along with a soundness determination method.

Solution to Problem

The toll collection system 1 according to one aspect of the present invention includes: roadside antennas 3a. 3b wirelessly communicating with an on-board device A1 mounted in a vehicle A; a communication processing unit 21 for carrying out communication processing based on predetermined communication specifications with the on-board device via the roadside antennas; a communication control unit 20 for acquiring the results of communication processing from the communication processing unit and creating information for toll collection with regard to the on-board device; and a toll collection processing unit 10 for accepting the input of the information for toll collection from the communication control unit and carrying out toll collection processing based on this information for toll collection. In addition, in the toll collection system 1, in any of a communication pair of the roadside antenna and the communication processing unit, a communication pair of the communication processing unit and the communication control unit, and a communication pair of the communication control unit and the toll collection processing unit, when a first component, which is one part configuring the communication pair, accepts the input of a predetermined confirmation signal, the first component outputs a predetermined response signal, and a second component, which is the other part configuring the communication pair, outputs the confirmation signal to the first component and determines whether the first component is operating normally based on whether the input of the response signal has been accepted.

As a result, each component (the first component and the second component) configuring the communication pair, via the confirmation signal and the response signal, determines the soundness of the other component serving as a communication partner (whether the other component is operating normally). Therefore, in the event abnormalities occur in either component configuring the toll collection system, the abnormalities can be immediately detected. Consequently, abnormalities in the toll collection system can be detected.

Moreover, according to one aspect of the present invention, in the abovementioned toll collection system, in a case where the second component determines that the first component is not operating normally, the second component orders the restart of the first component.

As a result, in the event abnormalities are detected in either component configuring the toll collection system, because this detected component is immediately restarted, the abnormalities of the toll collection system can be more quickly recovered.

Moreover, according to one aspect of the present invention, in the abovementioned toll collection system, in a case where the second component determines that the first component is not operating normally, the second component outputs an abnormality signal notifying that the first component is not operating normally.

As a result, in a case where abnormalities are detected in each component configuring the toll collection system, the monitoring person and the like receiving the notification of the abnormalities can carry out recovery processing of the component based on his/her determination and thereby more accurately recover the abnormalities in the toll collection system.

Moreover, according to one aspect of the present invention, in the toll collection system, in the event the first component accepts the input of the first confirmation signal serving as the confirmation signal, the first component outputs a first response signal serving as the response signal, the second component outputs the first confirmation signal to the first component, and determines whether the first component is operating normally based on whether the input of the first response signal has been accepted, while in the event the second component accepts the input of a predetermined second confirmation signal, the second component further outputs a predetermined second response signal, and the first component further outputs the second confirmation signal to the second component, and determines whether the second component is operating normally based on whether the input of the second response signal has been accepted.

As a result, the first component and the second component configuring the communication pair mutually execute heartbeat processing (output the confirmation signal and confirm the presence of a response signal) in order to determine their mutual soundness. Therefore, in the event abnormalities occur in either the first component or the second component, the abnormalities can be detected and the occurrence locations of the abnormalities can be specified.

Moreover, the toll collection system according to one aspect of the present invention further includes: a system soundness determination unit 12, which determines that at least one of the roadside antenna, the communication processing unit, the communication control unit, and the toll collection processing unit is not operating normally in a case where the frequency of toll collection processing executed per unit time is lower than a predetermined reference processing frequency.

As a result, because a determination can be made, based on the number of the actual toll collection processing carried out in the toll collection processing unit, regarding whether abnormalities occur in any one of various devices configuring the toll collection system, abnormalities of the toll collection system can be more accurately detected.

Moreover, the toll collection system according to one aspect of the present invention further includes:

a reception strength acquisition unit 202 for acquiring reception strength information indicating the reception strength I of radio waves from the on-board device received by the roadside antenna; and a radio wave receiving soundness determination unit 203 for determining whether the roadside antenna is operating normally based on whether the time width, in which the reception strength of radio waves indicated in the reception strength information is lower than the predetermined reception determination threshold Ih, continues for a predetermined determination reference time th or longer.

As a result, because abnormalities in the operation of roadside antennas can be further detected using the reception strength of radio waves, abnormalities in the toll collection system can be further accurately detected.

Moreover, according to one aspect of the present invention, in the abovementioned toll collection system, the radio wave receiving soundness determination unit changes the determination reference time for each time span based on the statistical data D indicating how much a vehicle is driven.

As a result, in a case where the number of passing vehicles per unit time changes in accordance with the time span, the radio wave receiving soundness determination unit can apply the determination reference time suitable for the number of passing vehicles for each time span and determine the soundness of the roadside antennas. Therefore, abnormalities of the toll collection system can be further accurately detected.

Moreover, the toll collection system according to one aspect of the present invention further includes: a communication processing soundness determination unit 204, which determines that at least one of the roadside antenna or the communication processing unit is not operating normally in a case where the reception strength of radio waves indicated in the reception strength information is the reception determination threshold or higher and the results of the communication processing have not been correctly acquired from the communication processing unit.

As a result, because abnormalities in the operation of the roadside antennas or the communication processing unit can be further detected using the combination of reception strength (RSSI) of radio waves and the results of the communication processing of the communication processing unit, abnormalities in the toll collection system can be further accurately detected.

Moreover, in a soundness determination method according to one aspect of the present invention for determining the soundness of a toll collection system, the toll collection system includes: a roadside antenna which wirelessly communicates with an on-board device mounted in a vehicle; a communication processing unit for carrying out communication processing based on predetermined communication specifications with the on-board device via the roadside antenna; a communication control unit for acquiring the results of the communication processing from the communication processing unit and creating information for toll collection with regard to the on-board device; and a toll collection processing unit for accepting the input of the information for toll collection from the communication control unit and carrying out toll collection processing based on this information for toll collection, the method includes: a step, wherein, in any of a communication pair of the roadside antenna and the communication processing unit, a communication pair of the communication processing unit and the communication control unit, and a communication pair of the communication control unit and the toll collection processing unit, when a first component, which is one part configuring the communication pair, accepts the input of a predetermined confirmation signal, the first component outputs a predetermined response signal; and a step, wherein a second component, which is the other part configuring the communication pair, outputs the confirmation signal to the first component and determines whether the first component is operating normally based on whether the input of the response signal has been accepted.

Advantageous Effect of Invention

The abovementioned toll collection system and soundness determination method enable the provision of a free flow type toll collection system which can detect abnormalities.

DESCRIPTION OF EMBODIMENTS

Embodiment 1

Hereinafter, a toll collection system according to Embodiment 1 will be described in detail with reference to FIGS. 1 to 6.
Overall Configuration of the Toll Collection System FIG. 1 is a diagram illustrating the overall configuration of a toll collection system according to Embodiment 1.

The toll collection system 1 according to the present embodiment is a free flow type electronic toll collection system installed on the main line of an expressway (hereinafter, also described as a "main road") including two lanes L1, L2.

Figure 1:
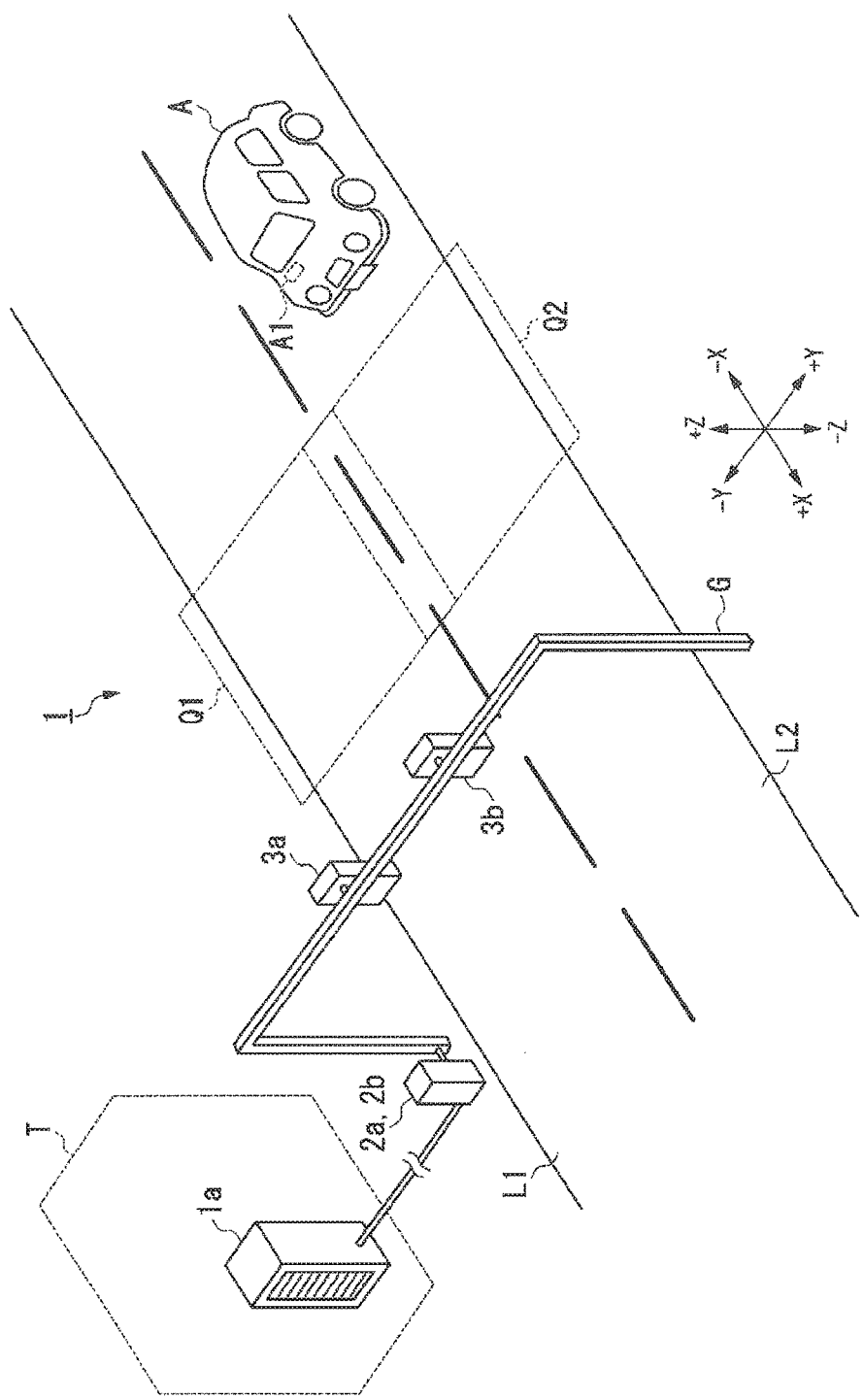
FIG. 1 is a diagram illustrating the overall configuration of a toll collection system according to Embodiment 1.

As illustrated in FIG. 1, the toll collection system 1 carries out communication processing for toll collection with an on-board device A1 mounted in a vehicle A while driving on main roads (lanes L1, L2) and executes toll collection processing on users riding in this vehicle A.

As illustrated in FIG. 1, the toll collection system 1 includes a toll collection processing device 1a, wireless communication control devices 2a, 2b, and roadside antennas 3a, 3b.

As illustrated in FIG. 1, the toll collection processing device 1a is installed in a communication tower T distant from the main roads (lanes L1, L2).

The wireless communication control devices 2a, 2b are installed on the roadside of lanes L1, L2 and in the vicinity of a gantry G. The wireless communication control devices 2a, 2b respectively carry out communication processing with the on-board device A1 via the roadside antennas 3a, 3b to acquire information for toll collection.

The roadside antennas 3a, 3b are attached to the gantry G, which is disposed across the lane width direction of the lanes L1, L2 (±Y direction of FIG. 1) and fixed over each of the lanes L1, L2.

The toll collection processing device 1a and the wireless communication control devices 2a. 2b, as well as the wireless communication control devices 2a, 2b and the roadside antennas 3a, 3b, are connected via wires (the below-mentioned optical cables, Ethernet (trade name) cables).

The roadside antennas 3a, 3b are interfaces for wireless communication which wirelessly communicate with the on-board device A1 via radio waves.

The roadside antenna 3a wirelessly communicates with the on-board device A1 present within a range of a specified communication region Q1 prespecified on the road surface of the lane L1. That is, communication processing is carried out on a vehicle A driving on the lane L1, via the roadside antenna 3a. Moreover, the roadside antenna 3b wirelessly communicates with the on-board device A1 present within a range of the specified communication region Q2 prespecified on the road surface of the lane L2. That is, communication processing is carried out on the vehicle A driving on the lane L2, via the roadside antenna 3b.

In this way, the present embodiment is an aspect in which communication processing for toll collection is carried out on each vehicle A driving on the two lanes L1, L2, via each of the two roadside antennas 3a, 3b.

Note that other embodiments are not limited to the abovementioned aspect and, for example, may include an aspect in which one roadside antenna is disposed on main roads including two lanes L1, L2. In this case, this one roadside antenna sets the specified communication region including the road surfaces of both lanes L1, L2.

Moreover, other embodiments may include an aspect in which one or two or more roadside antennas is/are disposed on main roads including three or more lanes.
Functional Elements of the Toll Collection System FIG. 2 is a diagram illustrating the functional elements of the toll collection system according to Embodiment 1.

Figure 2:
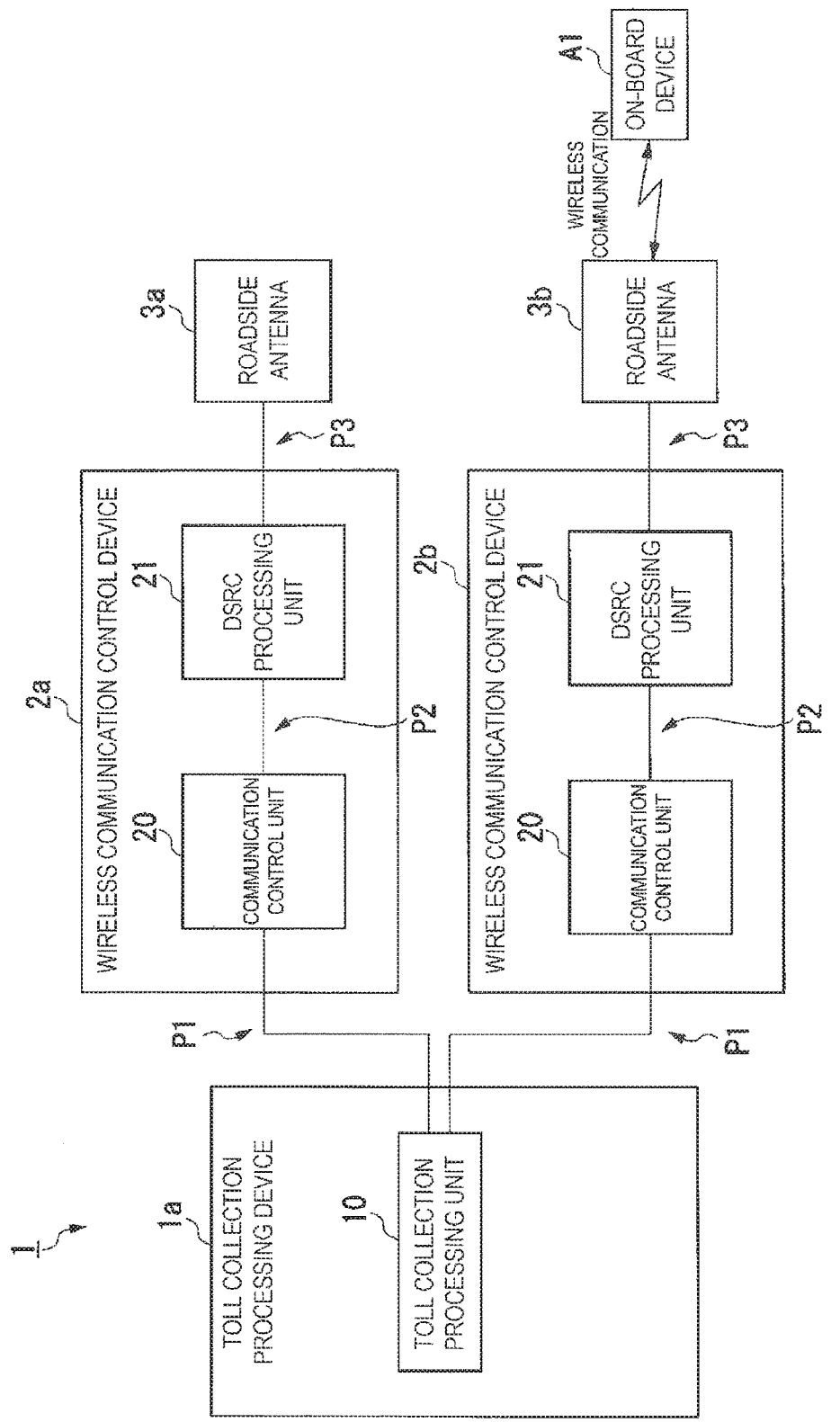
FIG. 2 is a diagram illustrating the functional elements of the toll collection system according to Embodiment 1.

As illustrated in FIG. 2, the toll collection processing device 1a of the toll collection system 1 includes a toll collection processing unit 10.

The toll collection processing unit 10 collects information for toll collection acquired via communication processing with the on-board device A1 from the wireless communication control devices 2a, 2b and carries out toll collection processing on users of an expressway based on this information for toll collection.

Moreover, as illustrated in FIG. 2, each of the wireless communication control devices 2a, 2b includes a communication control unit 20 along with a DSRC processing unit 21 (communication processing unit).

The communication control unit 20 is a processor controlling the operation of the overall wireless communication control devices 2a, 2b. In particular, the communication control unit 20 controls the operation of this DSRC processing unit 21 as a host controller of the below-mentioned DSRC processing unit 21. Specifically, the communication control unit 20 acquires a variety of information received via communication processing between the DSRC processing unit 21 and the on-board device A1. In addition, the communication control unit 20 summarizes the variety of acquired information and creates information for toll collection with regard to the on-board device A1 serving as the communication target of this DSRC processing unit 21.

The DSRC processing unit 21 carries out communication processing with the on-board device A1 via the roadside antennas 3a, 3b based on predetermined communication specifications. Here, in the present embodiment, predetermined communication specifications are Association of Radio Industries and Businesses (ARIB) standard specifications, which are the standard communication specifications of dedicated short-range communication (DSRC) systems.

The DSRC processing unit 21 acquires the variety of information recorded in the internal memory of the on-board device A1, and the like via dedicated short-range communication (DSRC) processing with the on-board device A1 based on the ARIB specifications and outputs it to the communication control unit 20.

In the present embodiment, the roadside antenna 3a and the DSRC processing unit 21 of the wireless communication control device 2a, as well as the roadside antenna 3b and the DSRC processing unit 21 of the wireless communication control device 2b, are connected to optical cables in which high speed data communication is possible.

Moreover, in the present embodiment, the communication control unit 20 of the wireless communication control device 2a, as well as the communication control unit 20 of the wireless communication control device 2b, is connected to the toll collection processing unit 10 of the toll collection processing device 1a installed in the communication tower T (FIG. 1) via Ethernet (trade name) cables.

However, other embodiments are not limited to the above-mentioned aspect and may include an aspect of connection via communication cables other than optical cables and Ethernet (trade name) cables.

Note that in the present embodiment, in the wireless communication control device 2a, the DSRC processing unit 21 and the communication control unit 20 are bus connected on the same circuit substrate. Similarly, in wireless the communication control device 2b, the DSRC processing unit 21 and the communication control unit 20 are bus connected on the same circuit substrate.

Note that as illustrated in FIG. 1, while the present embodiment has been described as an aspect in which the wireless communication control devices 2a, 2b are installed on the roadside of the lanes L1, L2 and in the vicinity of the gantry G, other embodiments are not limited to this aspect. For example, they may include an aspect in which the wireless communication control devices 2a, 2b are installed in the communication tower T (FIG. 1). In this case, the roadside antennas 3a, 3b and the wireless communication control devices 2a, 2b (DSRC processing units 21) are connected via optical cables and the like wired from the gantry G to the communication tower T Note that in the following description, a pair of a communication control unit 20 and a toll collection processing unit 10 is also written as "a communication pair P1", a pair of a DSRC processing unit 21 and a communication control unit 20 is also written as "a communication pair P2", and a pair of roadside antennas 3a. 3b and a DSRC processing unit 21 is also written as "a communication pair P3".

Functions of the DSRC Processing Unit

Figure 3:
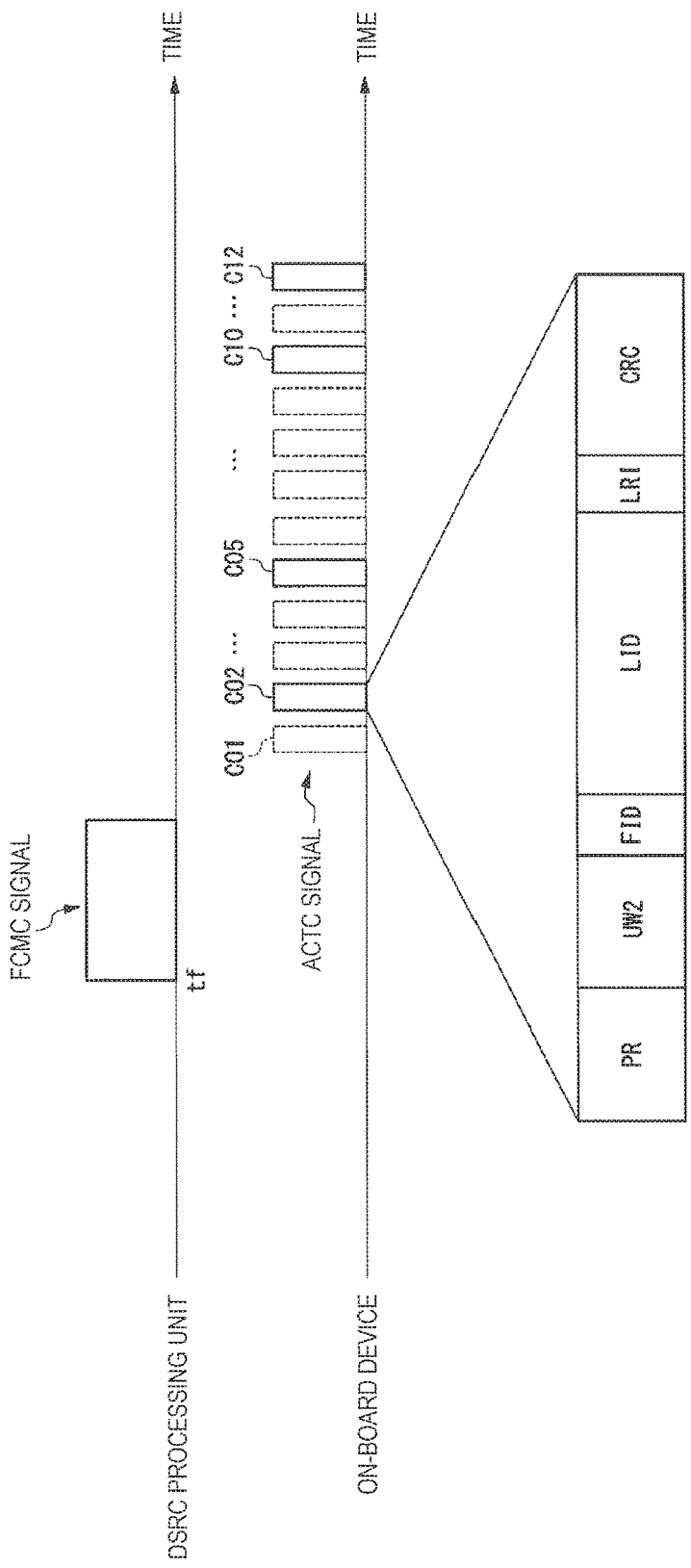
FIG. 3 is a drawing explaining the functions of a DSRC processing unit according to Embodiment 1.

FIG. 3 is a drawing explaining the functions of a DSRC processing unit according to Embodiment 1.

FIG. 3 illustrates an aspect of part of the dedicated short-range communication processing carried out between the on-board device A1 and the DSRC processing unit 21.

For example, the DSRC processing unit 21 (FIG. 2) provided in wireless the communication control device 2a transmits a "FCMC signal" (frame control message channel signal) based on the ARIB standard specifications via the roadside antenna 3a (or roadside antenna 3b) through radio waves at a certain time tf.

In a case where the on-board device A1 mounted in a vehicle A driving on the lane L1 (or the lane L2) receives radio waves overlapped by this FCMC signal, in response to the received FCMC signal, it similarly transmits (returns) an "ACTC signal" (activation channel signal) based on the ARIB standard specifications through radio waves.

Moreover, in the abovementioned ARIB standard specifications, the on-board device A1 which has received the FCMC signal transmits the ACTC signal through radio waves at the timing of receiving the FCMC signal as the reference timing, along with the timing corresponding to any one of 12 channels (channels C01 to C12 illustrated in FIG. 3) specified in different periods beforehand.

The timing at which the on-board device A1 transmits the ACTC signal (channels C01 to C12) is randomly selected for each transmission thereof. Thereby, for example, in the same specified communication region Q1, in a case where multiple vehicles A (on-board devices A1) have simultaneously received the FCMC signal, interference of the overlapped transmission timing of the ACTC signal transmitted from each of these multiple on-board devices A1 can be suppressed.

For example, in the example illustrated in FIG. 3, the ACTC signal from four different the on-board devices A1 is transmitted in the four periods of channels C02, C05, C10, C12.

Moreover, as illustrated in FIG. 3, in the ARIB standard specifications, the ACTC signal is configured such that a variety of information such as PR (preamble), UW2 (unique word), LID (link ID), and CRC is regularly arranged.

Here, PR is information assigned to the head of the ACTC signal and is also a data sequence disposed to be synchronized with reception processing on the reception side (DSRC processing unit 21). Moreover, UW2 is a data sequence for identifying the kind of signal including this UW2. UW2 contained in the ACTC signal includes information indicating that this signal is an "ACTC signal". Moreover, the LID includes identification information inherently allocated in the on-board device A1 serving as the transmission source. Moreover. CRC is a data sequence in accordance with information (arrangement pattern) of the ACTC signal to be transmitted and is also information assigned to determine the presence of data damage received by the reception source.

In a case where the DSRC processing unit 21 accepts the ACTC signal and specifies on-board device A1 which should be the communication target, it establishes a data link with this specified on-board device A1. Subsequently, the DSRC processing unit 21 continues further mutual communication with the on-board device A1 and acquires a variety of information (personal contract information, vehicle number information, vehicle type information, entrance information, and the like), which is information necessary for toll collection recorded in the on-board device A1. In addition, the DSRC processing unit 21 outputs, to the communication control unit 20, the abovementioned variety of information acquired as a result of dedicated short-range communication processing.

The communication control unit 20 summarizes the abovementioned variety of information acquired from the DSRC processing unit 21 as information for toll collection with regard to the on-board device A1 serving as the communication target of DSRC and outputs the information to the toll collection processing unit 10.

Functional Elements of the Wireless Communication Control Device

Figure 4:
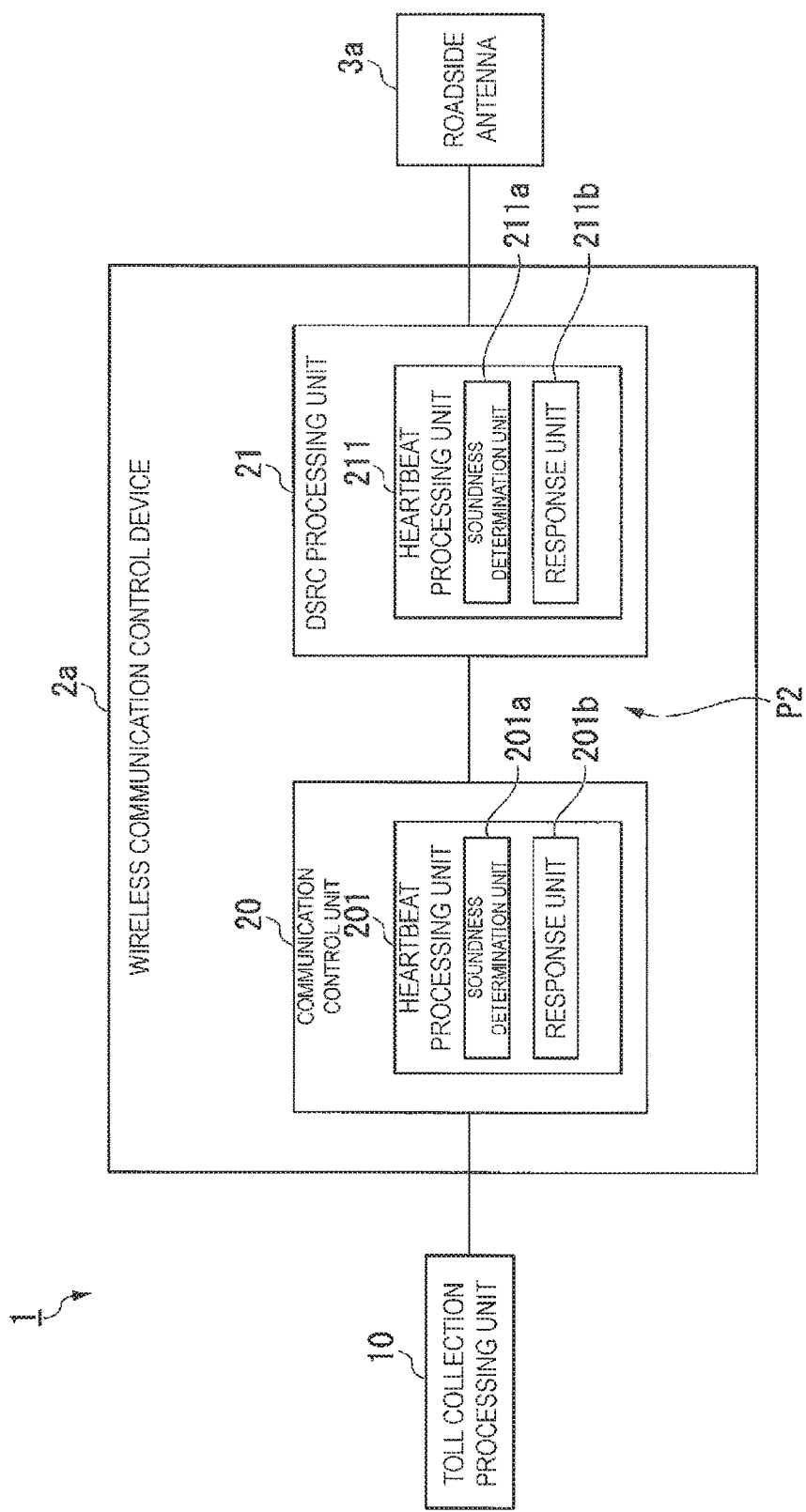
FIG. 4 is a diagram illustrating the functional elements of a wireless communication control device according to Embodiment 1.

FIG. 4 is a diagram illustrating the functional elements of a wireless communication control device according to Embodiment 1.

In FIG. 4, detailed functional elements regarding the wireless communication control device 2a are illustrated. Note that the functional elements of the wireless communication control device 2b are the same as those of the wireless communication control device 2a.

As illustrated in FIG. 4, the communication control unit 20 and the DSRC processing unit 21 respectively include heartbeat processing units 201, 211.

Moreover, the heartbeat processing unit 211 of the DSRC processing unit 21 includes a soundness determination unit 211a along with a response unit 211b. Similarly, the heartbeat processing unit 201 of the communication control unit 20 includes a soundness determination unit 201a along with a response unit 201b.

The soundness determination unit 211a of the DSRC processing unit 21 outputs a predetermined confirmation signal (first confirmation signal) to the communication control unit 20 and determines whether the communication control unit 20 is operating normally based on whether the input of a predetermined response signal (first response signal) associated with this first confirmation signal has been accepted.

Here, in the present embodiment, for example, "associated with" indicates that the same signal identifier as the inherent signal identifier assigned to the first confirmation signal is assigned in the first response signal. As a result, the transmission side (soundness determination unit 211a) of the first confirmation signal can identify whether the received response signal is a return signal to the first confirmation signal output by itself.

Moreover, the soundness determination unit 201a of the communication control unit 20 outputs a predetermined confirmation signal (second confirmation signal) to the DSRC processing unit 21 and determines whether the DSRC processing unit 21 is operating normally based on whether the input of a predetermined response signal (second response signal) associated with this second confirmation signal has been accepted.

Moreover, in a case where the response unit 211b of the DSRC processing unit 21 has accepted the input of the second confirmation signal from the soundness determination unit 201a, the response unit 211b outputs a second response signal associated with this second confirmation signal to the communication control unit 20.

Moreover, in a case where the response unit 201b of the communication control unit 20 has accepted the input of the first confirmation signal from the soundness determination unit 211a, the response unit 201b outputs a first response signal associated with this first confirmation signal to the DSRC processing unit 21.

In this way, in the toll collection system 1 according to the present embodiment, each component (communication control unit 20 and DSRC processing unit 21) configuring the communication pair P2 mutually exchanges confirmation signals (a first confirmation signal and a second confirmation signal) and response signals (a first response signal and a second response signal) and determines their mutual soundness.

Note that in this case, the first component configuring the communication pair P2 is one of the communication control unit 20 or the DSRC processing unit 21, while the second component configuring the communication pair P2 is the other communication control unit 20 or the DSRC processing unit 21.

Processing Flow of the Communication Control Unit and the DSRC Processing Unit

Figure 5:
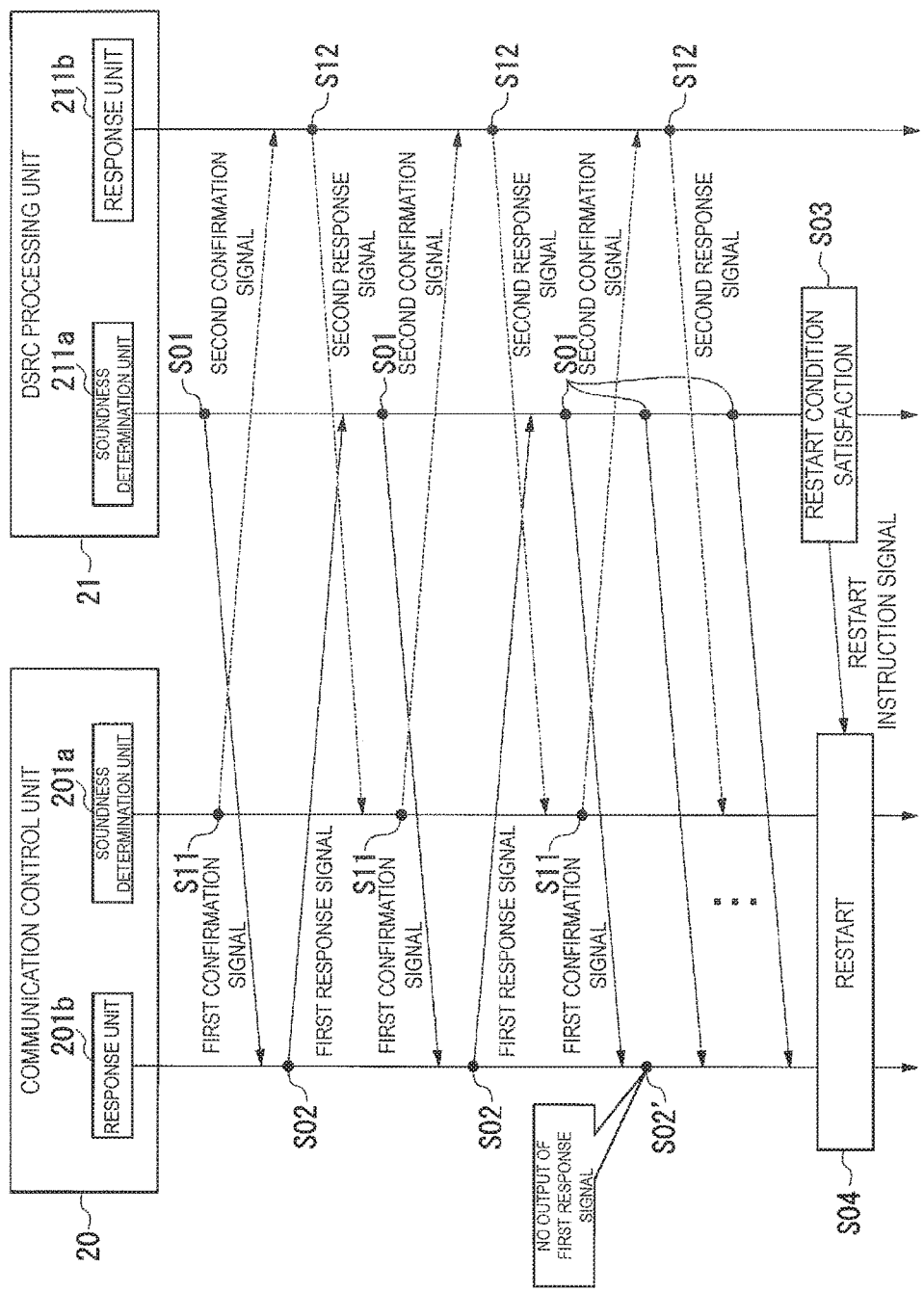
FIG. 5 is a diagram illustrating the processing flow of a communication control unit and the DSRC processing unit according to Embodiment 1.

FIG. 5 is a diagram illustrating the processing flow of a communication control unit and the DSRC processing unit according to Embodiment 1.

As illustrated in FIG. 5, the soundness determination unit 211a of DSRC the processing unit 21 outputs the first confirmation signal to the communication control unit 20 (Step S01). The response unit 201b of the communication control unit 20 which accepts the input of the first confirmation signal immediately outputs the first response signal associated with this first confirmation signal to the DSRC processing unit 21 (Step S02). If the soundness determination unit 211a accepts the input of the first response signal associated with the first confirmation signal, the soundness determination unit 211a determines that communication control unit 20 is operating normally and again outputs the first confirmation signal after a constant time has elapsed (Step 01).

In this way, the soundness determination unit 211a of the DSRC processing unit 21 and the response unit 201b of the communication control unit 20 constantly and repeatedly execute the processing of Step S01 and Step S02.

In contrast, the soundness determination unit 201a of the communication control unit 20 outputs the second confirmation signal to the DSRC processing unit 21 (Step S11). The response unit 211b of the DSRC processing unit 21 which accepts the input of the second confirmation signal immediately outputs the second response signal associated with this second confirmation signal to the communication control unit 20 (Step S12). If the soundness determination unit 201a accepts the input of the second response signal associated with the second confirmation signal, the soundness determination unit 201a determines that the DSRC processing unit 21 is operating normally and again outputs the second confirmation signal after a constant time has elapsed (Step 11).

In this way, the soundness determination unit 201a of the communication control unit 20 and the response unit 211b of the DSRC processing unit 21 constantly and repeatedly execute the processing of Step S11 and Step S12.

Here, the flow of processing in which abnormalities have occurred in the operation of the communication control unit 20 at a certain timing will be described.

In this case, after the timing in which abnormalities have occurred, the response unit 201b of the communication control unit 20 does not output the first response signal from the soundness determination unit 211a to the first confirmation signal (Step S02').

The soundness determination unit 211a detects the absence of the input of the first response signal, despite the output of the first confirmation signal, and counts the number of occurrences of this event. In addition, once the number of occurrences of the event of "the absence of the input of the first response signal despite the output of the first confirmation signal" reaches a predetermined number, the soundness determination unit 211a determines that the communication control unit 20 is not operating normally.

In this case, the soundness determination unit 211a further determines that the restart conditions of the communication control unit 20 are satisfied and outputs a restart instruction signal to the communication control unit 20 (Step S03). If the communication control unit 20, which has been determined to be in an abnormal state, accepts this restart instruction signal, the communication control unit 20 immediately executes restart processing (Step S04). Upon the completion of restart processing, the communication control unit 20 recovers from the abnormal state and operates normally.

Note that the flow of processing for the case in which abnormalities have occurred in the operation of the communication control unit 20 has been described above, with the same applying to the flow of processing for the case in which abnormalities have occurred in the operation of the DSRC processing unit 21. That is, once the number of occurrences of the event of "the absence of the input of the second response signal despite the output of the second confirmation signal" reaches a predetermined number, the soundness determination unit 201a of the communication control unit 20 determines that the DSRC processing unit 21 is not operating normally and executes restart processing of the DSRC processing unit 21.

Operational Effects

As described above, the toll collection system 1 according to Embodiment 1 includes: a roadside antennas 3a, 3b which wirelessly communicate with an on-board device A1 mounted in a vehicle A; a DSRC processing unit 21 for carrying out dedicated short-range communication processing based on predetermined communication specifications (ARIB standard specifications) with the on-board device A1 via roadside antennas 3a, 3b; a communication control unit 20 for acquiring the results of the dedicated short-range communication processing based on the ARIB standard specifications from the DSRC processing unit 21 and creating information for toll collection with regard to the on-board device A1; and a toll collection processing unit 10 for accepting the input of information for toll collection from the communication control unit 20 and carrying out toll collection processing based on this information for toll collection.

Moreover, in the toll collection system 1 according to Embodiment 1, in a case where the communication control unit 20 serving as one configuring the communication pair P2 (FIG. 2) accepts the input of the first confirmation signal from the DSRC processing unit 21, the communication control unit 20 includes a response unit 201b for outputting a predetermined response signal associated with this first confirmation signal.

In addition, the DSRC processing unit 21 serving as the other configuring the communication pair P2 includes a soundness determination unit 211a for outputting the first confirmation signal to the communication control unit 20 and determining whether the communication control unit 20 is operating normally based on whether the input of a first response signal associated with this first confirmation signal has been accepted.

In this way, the soundness determination unit 211a, via the confirmation signal and the response signal, regularly determines the soundness of the communication control unit 20 serving as a communication partner (whether the communication control unit 20 is operating normally). Therefore, in a case where abnormalities have occurred in this communication control unit 20, the abnormalities can be immediately detected.

Consequently, in accordance with the toll collection system 1 according to Embodiment 1, in a free flow type toll collection system, abnormalities can be quickly and accurately detected.

Moreover, in a case where the toll collection processing unit 10 with information for toll collection collected is "upstream" with respect to the roadside antennas 3a. 3b which wirelessly communicate with the on-board device A1, in the toll collection system 1 according to the present embodiment, a component (DSRC processing unit 21) located on the downstream side carries out heartbeat processing (outputs the confirmation signal and confirms the presence of a response signal) on a component (communication control unit 20) located on the upstream side in order to determine the soundness of this component on the upstream side.

Here, for example, the case is contemplated in which the toll collection processing unit 10 located on the upstream side of the communication control unit 20 carries out heartbeat processing on this communication control unit 20. In this case, the toll collection processing unit 10 located on the upstream side needs to output the confirmation signal to each of multiple (two) communication control units 20 (communication control units 20 provided in the wireless communication control devices 2a, 2b) located on the downstream side. Moreover, the toll collection processing unit 10 located on the upstream side accepts the input of the response signal from each of multiple communication control units 20 located on the downstream side. Therefore, in the toll collection processing unit 10, the time capable of being assigned to heartbeat processing to one communication control unit 20 decreases, prolonging the time interval. Moreover, in the present embodiment, the physical distance from the toll collection processing unit 10 to the communication control unit 20 is long, with relatively long Ethernet (trade name) cables wired and connected.

Due to the above factors, in a case where the toll collection processing unit 10 carries out heartbeat processing on the communication control unit 20, abnormalities occurring in this communication control unit 20 may be unable to be quickly detected.

In contrast, compared with the toll collection processing unit 10, processing which should be carried out by the DSRC processing unit 21 is simpler and operable at a higher speed, with a shorter distance of the processing unit 21 and the communication control unit 20. Therefore, as in the present embodiment, when the DSRC processing unit 21 located on the downstream side carries out heartbeat processing on the communication control unit 20 and abnormalities have occurred in this communication control unit 20, the abnormalities can be more quickly detected.

Moreover, in the present embodiment, the DSRC processing unit 21 further includes a response unit 211b for outputting the second response signal associated with the second confirmation signal in a case where the input of this second confirmation signal from the communication control unit 20 has been accepted. Moreover, the communication control unit 20 includes a soundness determination unit 201*a* for outputting the second confirmation signal to the DSRC processing unit 21 and determining whether the DSRC processing unit 21 is operating normally based on whether the input of a second response signal associated with this second confirmation signal has been accepted.

As a result, because the communication control unit 20 and the DSRC processing unit 21 mutually execute heartbeat processing and confirm their mutual soundness, in a case where abnormalities have occurred in either the communication control unit 20 or the DSRC processing unit 21, the abnormalities can be detected and the occurrence locations of the abnormalities can be specified.

Moreover, in a case where the soundness determination units 211*a*, 201*a* according to the present embodiment determine the target components (communication control unit 20 and DSRC processing unit 21) are not operating normally, the soundness determination units 211*a*, 201*a* instruct the restart of the target components.

As a result, in a case where abnormalities are detected in each component configuring toll collection system 1, because this detected component is immediately restarted, the abnormalities of the toll collection system 1 can be more quickly recovered.

In the foregoing, the toll collection system 1 according to Embodiment 1 has been described in detail. However, specific aspects of the toll collection system 1 according to Embodiment 1 are not limited to those described above, with various design modifications, for example, capable of being made without departing from the gist thereof.

Modified Example of Embodiment 1

Figure 6:
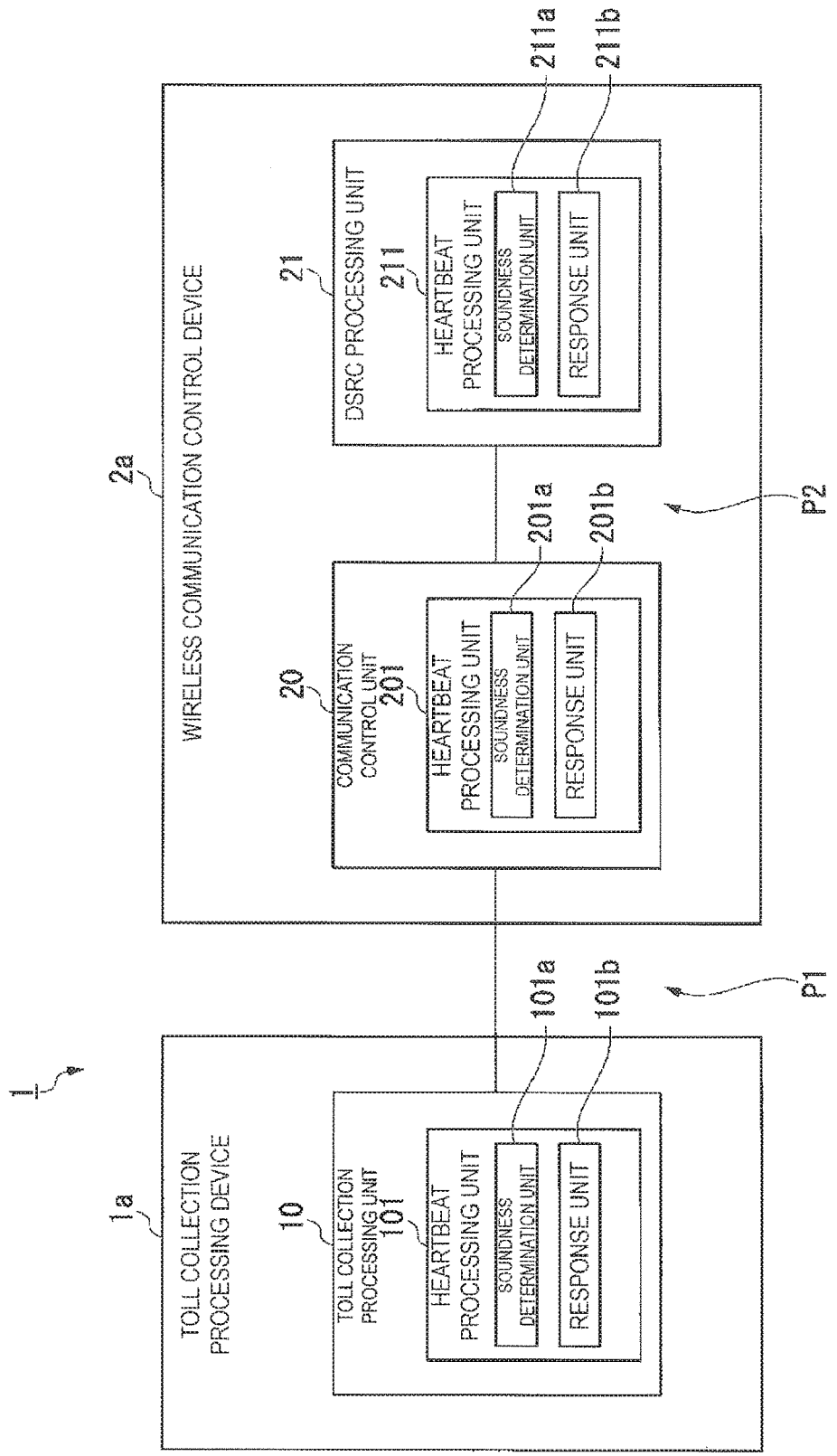
FIG. 6 is a diagram illustrating the functional elements of a toll collection system according to a modified example of Embodiment 1.

FIG. 6 is a diagram illustrating the functional elements of a toll collection system according to a modified example of Embodiment 1.

As illustrated in FIG. 6, the toll collection processing unit 10 of the toll collection processing device 1*a* according to the present modified example includes a heartbeat processing unit 101. Moreover, the heartbeat processing unit 101 of the toll collection processing unit 10 includes a soundness determination unit 101*a* along with a response unit 101*b*.

The soundness determination unit 101*a* of the toll collection processing unit 10 outputs a predetermined confirmation signal (third confirmation signal) to the communication control unit 20 and determines whether the communication control unit 20 is operating normally based on whether the input of a predetermined response signal (third response signal) associated with the third confirmation signal has been accepted.

Moreover, the soundness determination unit 201*a* of the communication control unit 20 further outputs a predetermined confirmation signal (fourth confirmation signal) to the toll collection processing unit 10, and determines whether the toll collection processing unit 10 is operating normally based on whether the input of a predetermined response signal (fourth response signal) associated with the fourth confirmation signal has been accepted.

Moreover, in a case where the response unit 101*b* of the toll collection processing unit 10 accepts the input of the fourth confirmation signal from the soundness determination unit 201*a*, the response unit 101*b* outputs a fourth response signal associated with this fourth confirmation signal to the communication control unit 20.

Moreover, in a case where the response unit 201*b* of the communication control unit 20 accepts the input of the third confirmation signal from the soundness determination unit 101*a*, the response unit 201*b* outputs a third response signal associated with this third confirmation signal to the toll collection processing unit 10.

In this way, in the toll collection system 1 according to the present modified example, each component (toll collection processing unit 10 and communication control unit 20) configuring the communication pair P1 mutually exchanges confirmation signals (a third confirmation signal and a fourth confirmation signal) and response signals (a third response signal and a fourth response signal) and determines their mutual soundness.

Note that in this case, the first component configuring the communication pair P1 is one of the toll collection processing unit 10 or the communication control unit 20, while the second component configuring the communication pair P1 is the other toll collection processing unit 10 or the communication control unit 20.

As a result, because the soundness determination unit 201*a* of the communication control unit 20 regularly determines, via the confirmation signal and the response signal, the soundness of the toll collection processing unit 10 serving as a communication partner, in a case where abnormalities occur in this toll collection processing unit 10, the soundness determination unit 201*a* can immediately detect these abnormalities.

Further, because the soundness determination unit 101*a* of the toll collection processing unit 10 regularly determines, via the confirmation signal and the response signal, the soundness of the communication control unit 20 serving as a communication partner, in a case where abnormalities occur in this toll collection processing unit 10, the soundness determination unit 101*a* can immediately detect these abnormalities.

Therefore, abnormalities of the toll collection system 1 can be further quickly and accurately detected.

Moreover, while the toll collection system 1 according to the abovementioned modified example has been described as an aspect including a heartbeat processing unit 101 in the toll collection processing unit 10, other embodiments are not limited to this aspect.

For example, the toll collection system 1 according to still another modified example may include an aspect in which each component (DSRC processing unit 21 and roadside antennas 3*a*, 3*b*) configuring the communication pair P3 mutually exchanges confirmation signals and response signals and determines their mutual soundness.

Specifically, the roadside antennas 3*a*, 3*b* may include heartbeat processing units (a soundness determination unit and a response unit). In this case, the soundness determination units of the roadside antennas 3*a*, 3*b* output the confirmation signal to the DSRC processing unit 21. In addition, the soundness determination units of the roadside antennas 3*a*, 3*b* determine the soundness of the DSRC processing unit 21 based on whether they have input the response signal from the DSRC processing unit 21.

Moreover, in a case where the response units of the roadside antennas 3*a*, 3*b* have accepted the input of the confirmation signal from the DSRC processing unit 21, the response units output the response signal associated with this confirmation signal to the DSRC processing unit 21.

Note that in this case, the first component configuring the communication pair P3 is one of either the DSRC processing unit 21 or the roadside antennas 3a, 3b, while the second component is the other DSRC processing unit 21 or the roadside antennas 3a, 3b.

Moreover, the toll collection system 1 according to the abovementioned Embodiment 1 has been described such that both components (communication control unit 20 and DSRC processing unit 21) configuring the communication pair P2 mutually carry out heartbeat processing. However, other embodiments are not limited to this aspect, with an aspect capable of being used in which heartbeat processing is carried out from one of either the communication control unit 20 or the DSRC processing unit 21 to the other.

Specifically, for example, the DSRC processing unit 21 only includes a soundness determination unit 211a, while the communication control unit 20 only includes a response unit 201b. In this case, in the communication pair P2, only heartbeat processing from the DSRC processing unit 21 to the communication control unit 20 is carried out.

Other communication pairs P1, P3 may also include an aspect in which heartbeat processing is carried out from one of the components configuring each of the communication pairs P1, P3 to the other component thereof.

Moreover, Embodiment 1 has been described as an aspect in which, in a case where each of the soundness determination unit 211a of the DSRC processing unit 21 and the soundness determination unit 201a of the communication control unit 20 determines that the operation of the target components (communication control unit 20 and DSRC processing unit 21) has abnormalities, it outputs a restart instruction signal to the components and executes restart (Step S04 of FIG. 5). However, other embodiments are not limited to this aspect.

For example, other embodiments may include an aspect in which, in a case where the soundness determination units 201a, 211a determine that the operation of the target component has abnormalities, a monitoring person, and the like residing in a central facility of the toll collection system 1 and the like is notified of the abnormalities.

Specifically, in a case where the soundness determination unit 211a of the DSRC processing unit 21 determines that the communication control unit 20 is not operating normally, the soundness determination unit 211a outputs an abnormality signal for notifying that this communication control unit 20 is not operating normally. In addition, in a case where monitoring equipment provided in the abovementioned central facility has accepted the input of the abnormality signal, a monitoring person is notified that abnormalities have occurred in the operation of the communication control unit 20, for example, via a monitor.

Thereby, a monitoring person can quickly and accurately recognize that abnormalities have occurred. Therefore, in a case where abnormalities are detected in the communication control unit 20, the monitoring person receiving the notification can carry out recovery processing of the communication control unit 20 based on his/her determination and thereby more accurately recover the abnormalities in the toll collection system 1.

Note that in the abovementioned aspect, it is contemplated that even in a case where the component on the downstream side can detect abnormalities in the components on the upstream side, because the component located on the upstream side, which is located between the component on the downstream side and a central facility (in which a monitoring person waits), has abnormalities, a central facility further upstream cannot be notified of abnormalities. Therefore, the toll collection system 1 may have a communication line for directly transmitting the abovementioned notification to the central facility in a case where the component on the downstream side has detected abnormalities in the component on the upstream side.

Embodiment 2

Subsequently, a toll collection system according to Embodiment 2 will be described in detail with reference to FIGS. 7 to 11.

Functional Elements of the Toll Collection System

Figure 7:
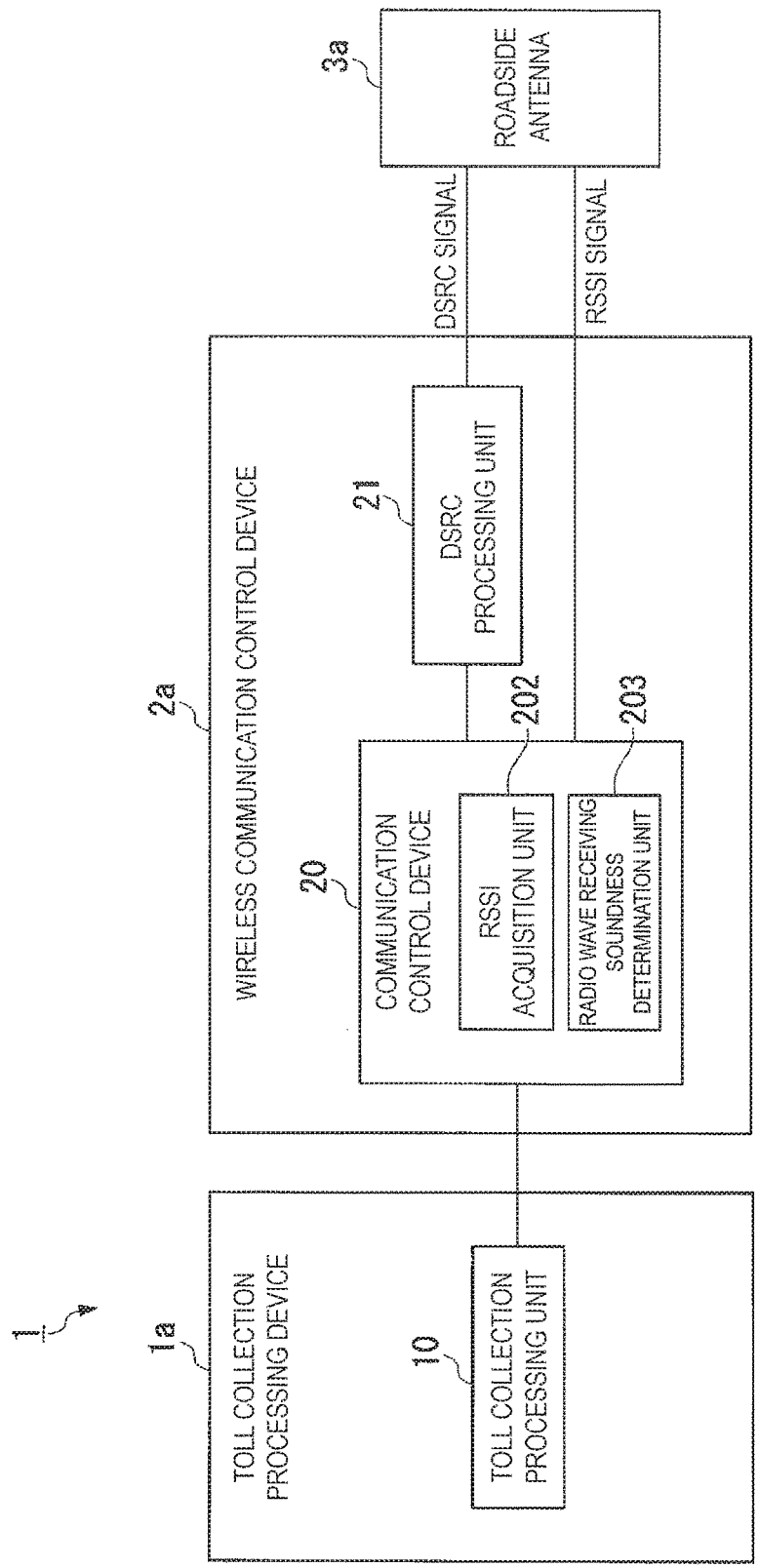
FIG. 7 is a diagram illustrating the functional elements of a toll collection system according to Embodiment 2.

FIG. 7 is a diagram illustrating the functional elements of the toll collection system according to Embodiment 2.

In FIG. 7, the same components as those in Embodiment 1 will be denoted by the same reference symbols, with descriptions thereof omitted.

As illustrated in FIG. 7, the toll collection system 1 according to Embodiment 2, as in Embodiment 1, includes a toll collection processing device 1a, a wireless communication control device 2a, and a roadside antenna 3a. Note that the toll collection system 1 according to the present embodiment, as in Embodiment 1, further includes a wireless communication control device 2b and a roadside antenna 3b (refer to FIG. 2), with the illustration of the configuration thereof omitted.

The wireless communication control device 2a illustrated in FIG. 7 includes a communication control unit 20 along with a DSRC processing unit 21.

Moreover, as illustrated in FIG. 7, the communication control unit 20 includes an RSSI acquisition unit 202 (reception strength acquisition unit) along with a radio wave receiving soundness determination unit 203.

The RSSI acquisition unit 202 acquires an RSSI signal (reception strength information) indicating the reception strength (RSSI: Received Signal Strength Indication) of radio waves received by this roadside antenna 3a, from the roadside antenna 3a.

The radio wave receiving soundness determination unit 203 determines whether the roadside antenna 3a is operating normally based on whether the time span, in which the reception strength I of radio waves indicated by the RSSI signal is lower than the predetermined reception determination threshold Ih (I<Ih), continues for the predetermined determination reference time th or longer.

Note that in the present embodiment, while the communication control unit 20, the DSRC processing unit 21, the toll collection processing unit 10, and the roadside antenna 3a, as in Embodiment 1 (or a modified example thereof), are described as including heartbeat processing units 201, 202, and the like, other embodiments are not limited to this aspect.

That is, other embodiments may include an aspect in which the communication control unit 20, the DSRC processing unit 21, the toll collection processing unit 10, and the roadside antenna 3a do not include heartbeat processing units 201, 202, and the like.

Functional Elements of the Roadside Antenna

Figure 8:
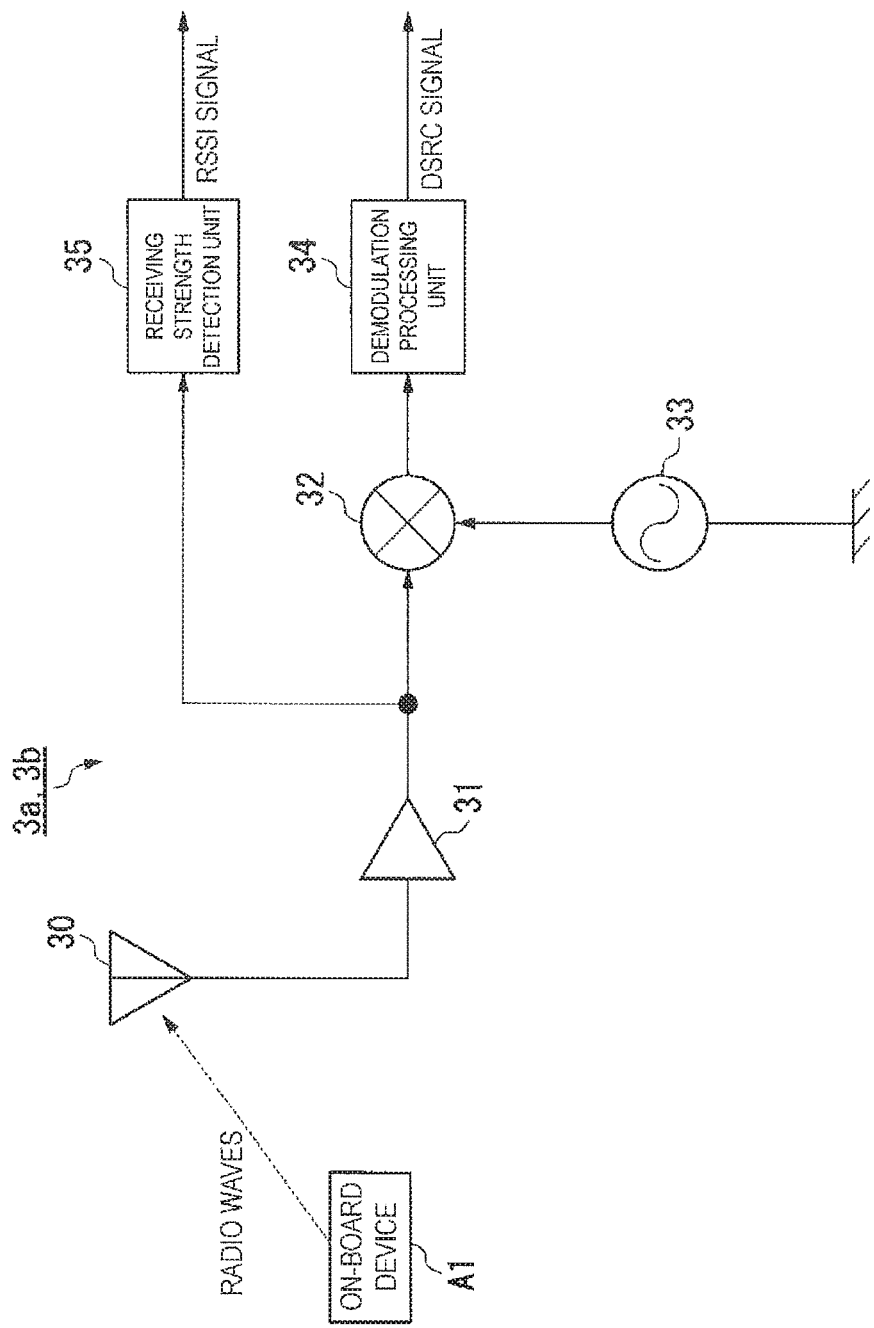
FIG. 8 is a diagram illustrating the functional elements of a roadside antenna according to Embodiment 2.

FIG. 8 is a diagram illustrating the functional elements of a roadside antenna according to Embodiment 2.

As illustrated in FIG. 8, the roadside antennas 3a, 3b include an antenna element 30, an amplifier 31, a mixer 32, a reference oscillation source 33, a demodulation processing unit 34, and a reception strength detection unit 35.

The antenna element 30 is an element for receiving radio waves sent from the on-board device A1.

The amplifier 31 is, for example, LNA (Low Noise Amplifier), for amplifying and outputting a high frequency signal output from the antenna element 30 in accordance with the reception of radio waves.

The mixer 32 mixes, with a reference frequency signal, the high frequency signal output from the antenna element 30 and amplified by the amplifier 31, and converts them to a low frequency signal.

The reference oscillation source 33 outputs the reference frequency signal which oscillates at a predetermined reference frequency.

The demodulation processing unit 34 carries out demodulation processing on a signal converted to a low frequency and extracts information overlapped by the received radio waves (for example, UW2, LID, and the like described in FIG. 3). The demodulation processing unit 34 outputs extracted information as a DSRC signal to the DSRC processing unit 21 (FIG. 7).

The reception strength detection unit 35 is a detection sensor for inputting the high frequency signal output from the antenna element 30 and amplified by the amplifier 31, in addition to detecting the reception strength I. The reception strength detection unit 35 outputs the RSSI signal indicating the detected reception strength I.

Processing Flow of the Radio Wave Receiving Soundness Determination Unit

Figure 9:
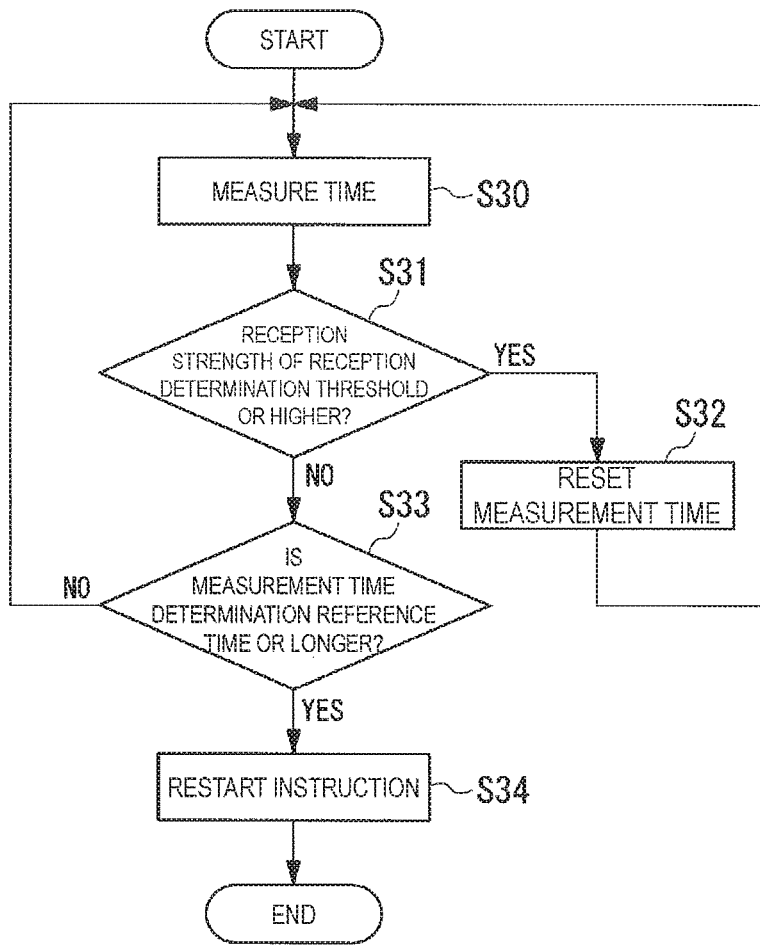
FIG. 9 is a diagram illustrating the processing flow of a radio wave receiving soundness determination unit according to Embodiment 2.

FIG. 9 is a diagram illustrating the processing flow of a radio wave receiving soundness determination unit according to Embodiment 2.

First, while measuring the time after a certain time of day has elapsed (Step S30), the radio wave receiving soundness determination unit 203 determines, based on the RSSI signal acquired by the RSSI acquisition unit 202, whether the reception strength I of the predetermined reception determination threshold Ih or higher has been detected (Step S31).

If the reception strength I of the reception determination threshold Ih or higher has been detected (Step S31: YES), the radio wave receiving soundness determination unit 203 resets the time during measurement (Step S32), and restarts measuring the time in Step S30. In contrast, if the reception strength I of the reception determination threshold Ih or higher has not been detected (Step S31: NO), a determination is made regarding whether time (measurement time t) during measurement in Step S30 is the prespecified determination reference time th or longer (Step S33).

If the measurement time t is not the determination reference time th or longer (Step S33: NO), the radio wave receiving soundness determination unit 203 continues measuring the time in Step S30. In contrast, if it has reached the determination reference time th (Step S33: YES), the radio wave receiving soundness determination unit 203 determines that abnormalities have occurred in the roadside antenna 3a and instructs the roadside antenna 3a to restart processing (Step S34).

Operational Effects

As described above, the toll collection system 1 according to Embodiment 2 includes: a RSSI acquisition unit 202 for acquiring the RSSI signal indicating the reception strength I of radio waves from an on-board device A1 received by roadside antennas 3a, 3b; and a radio wave receiving soundness determination unit 203 for determining whether the roadside antennas 3a, 3b are operating normally based on whether the time width (measurement time t), in which the reception strength I of radio waves indicated in the RSSI signal is lower than a predetermined reception determination threshold Ih, continues for a predetermined determination reference time th or longer.

Here, in specified communication regions Q1, Q2 of the toll collection system 1 (FIG. 1), a vehicle A normally drives at a predetermined frequency (the number of passing vehicles per unit time) in accordance with the user number of an expressway (the amount a vehicle A is driven). That is, the roadside antennas 3a, 3b receive radio waves from the on-board device A1 at a predetermined frequency in accordance with the amount a vehicle A is driven on the expressway and wirelessly communicate. Consequently, in the normal operation of the toll collection system 1, the time width, in the state in which roadside antennas 3a, 3b do not receive radio waves from the on-board device A1 is allowed continue, is contemplated from the number of passing vehicles per unit time in the specified communication region Q1.

In this case, in a case where the state of not observing the reception of radio waves from the on-board device A1 continues for a time clearly longer than the abovementioned contemplated time width, abnormalities by which "although a vehicle A actually passes through the specified communication regions Q1, Q2, the roadside antennas 3a, 3b have not correctly received radio waves from the on-board device A1" are dubious.

With that, in accordance with the abovementioned processing flow (Steps S30 to S34), the radio wave receiving soundness determination unit 203 determines that the operation of the roadside antennas 3a, 3b has abnormalities, in a case where the state, in which the reception strength I of radio waves is not the predetermined reception determination threshold Ih or higher, continues to the determination reference time th set based on the number of passing vehicles per unit time. In addition, the radio wave receiving soundness determination unit 203 instructs the roadside antennas 3a, 3b to restart processing.

As a result, because abnormalities in the operation of the roadside antennas 3a, 3b can be further detected using the reception strength (RSSI) of radio waves, abnormalities in the toll collection system 1 can be further accurately detected.

Modified Example of Embodiment 2

Figure 10:
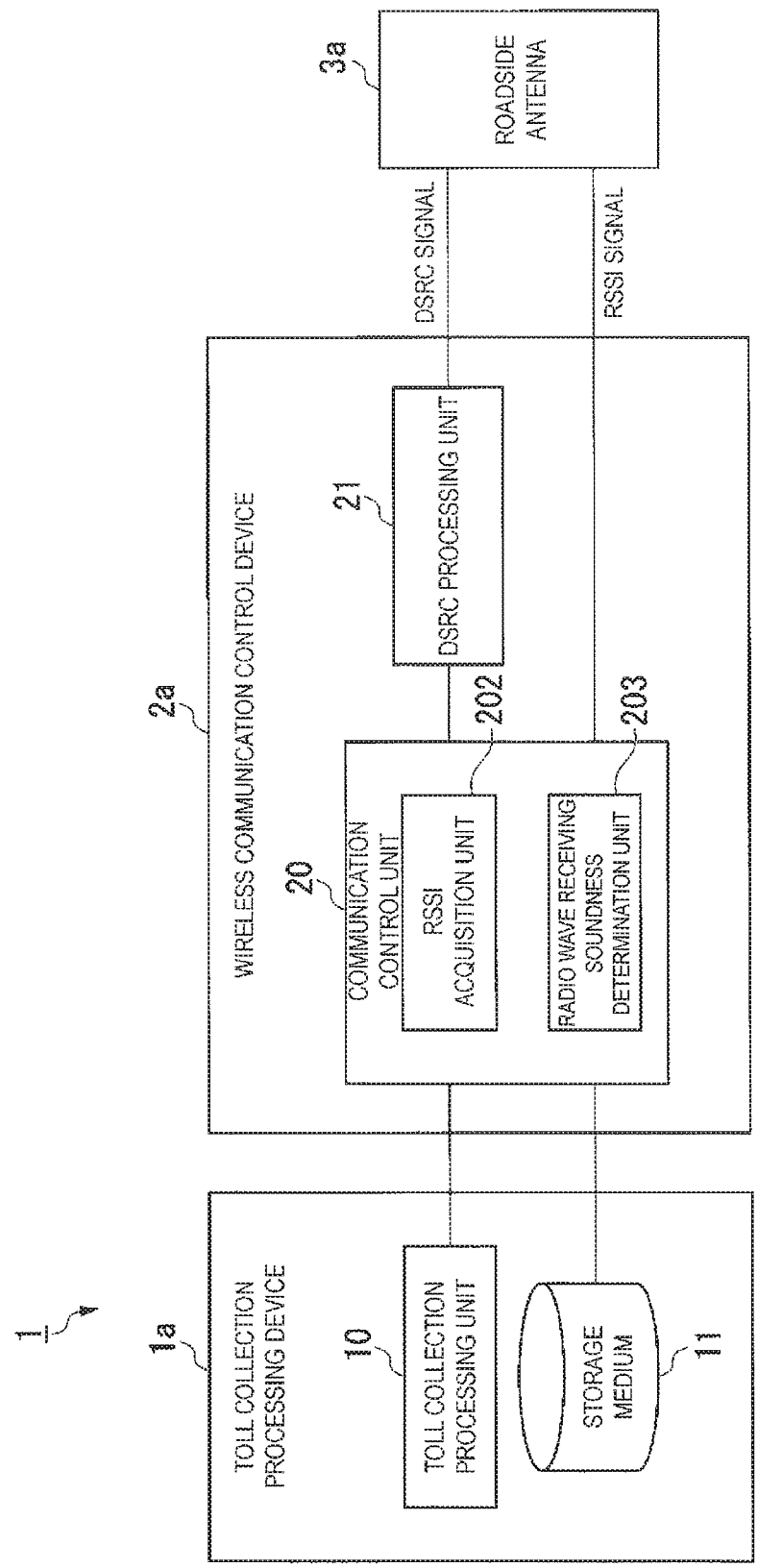
FIG. 10 is a diagram illustrating the functional elements of a toll collection system according to a modified example of Embodiment 2.

FIG. 10 is a diagram illustrating the functional elements of a toll collection system according to a modified example of Embodiment 2.

As illustrated in FI G. 10, the toll collection processing device 1a of the toll collection system 1 according to the present modified example includes a recording medium 11 with preacquired statistical data D (mentioned below) recorded therein.

Moreover, the radio wave receiving soundness determination unit 203 according to the present modified example further changes the determination reference time th for each time span based on the statistical data D indicating the amount a vehicle A is driven.

Figure 11:
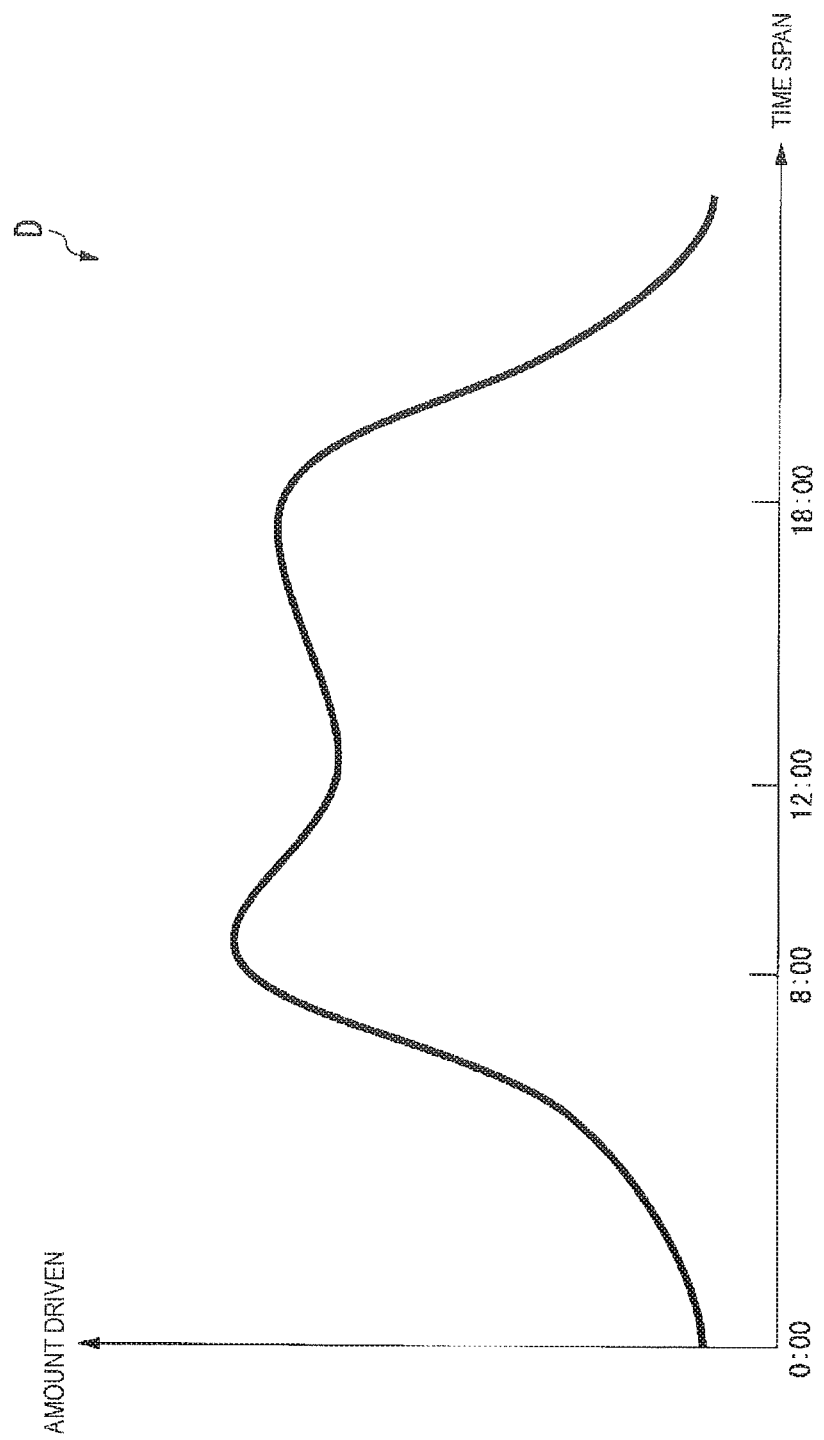
FIG. 11 is a diagram explaining the statistical data recorded in a recording medium according to a modified example of Embodiment 2.

FIG. 11 is a diagram explaining the statistical data recorded in a recording medium according to a modified example of Embodiment 2.

The toll collection processing unit 10 according to the present modified example sequentially records and accumulates information on toll collection processing (vehicle type information, license plate information, charging amount, year, month, day, and time, and the like) for each user of an expressway. In addition, the toll collection processing unit 10 creates statistical data D indicating the user number at each time span of one day (that is, the amount a vehicle A is driven) based on this accumulated information about toll collection processing (particularly the year, month, day, and time).

Here, in accordance with the example of the statistical data D illustrated in FIG. 11, in the toll collection system 1 according to the present modified example, the amount a vehicle A is driven increases from early morning (about 8 o'clock) to evening (about 18 o'clock), while the amount a vehicle A is driven at midnight (about 0 o'clock) tends to decrease.

Based on this statistical data D, for example, the radio wave receiving soundness determination unit 203 according to the present modified example carries out processing so as to set the determination reference time th to be relatively short, for the time span in which the amount a vehicle A is driven is large, and in contrast, set the determination reference time th to be relatively long, for the midnight time span in which the amount a vehicle A is driven is small.

As a result, in a case where the number of passing vehicles per unit time changes in accordance with the time span, the radio wave receiving soundness determination unit 203 can apply the determination reference time th suitable for the number of passing vehicles for each time span and determine the soundness of the roadside antennas 3a, 3b.

Note that while the abovementioned modified example has been described as an aspect in which the toll collection processing unit 10 creates statistical data D based on information with regard to accumulated toll collection processing, still other modified examples are not limited to this aspect. For example, simply by measuring reception strength (RSSI) of radio waves for each time span, the toll collection processing unit 10 may create statistical data D indicating a user number for each time span of one day.

Note that while the radio wave receiving soundness determination unit 203 according to a modified example of Embodiment 2 has been described as referring to the statistical data D indicating the amount a vehicle A is driven for each time span of one day (early morning, evening, midnight, and the like) and changing the determination reference time th for each time span of one day, other embodiments are not limited to this aspect.

For example, the radio wave receiving soundness determination unit 203 according to another embodiment may refer to the statistical data D indicating the amount a vehicle A is driven for each time span of one month (beginning of month, end of month, and the like) or one year (beginning of year, end of year, each season, and the like) and change the determination reference time th for each time span of this one month or one year.

Moreover, Embodiment 2 has been described in which, if the radio wave receiving soundness determination unit 203 determines that abnormalities have occurred in the roadside antennas 3a, 3b, it instructs the roadside antennas 3a, 3b to restart processing (Step S34 of FIG. 9). However, other embodiments are not limited to this aspect.

For example, other embodiments may include an aspect in which, if the radio wave receiving soundness determination unit 203 determines that the operation of the target components (roadside antennas 3a, 3b) has abnormalities, the monitoring person and the like residing in a central facility of the toll collection system 1 and the like is notified of the abnormalities.

Embodiment 3

Subsequently, a toll collection system according to Embodiment 3 will be described in detail with reference to FIGS. 12 to 13.

Functional Elements of the Toll Collection System

Figure 12:
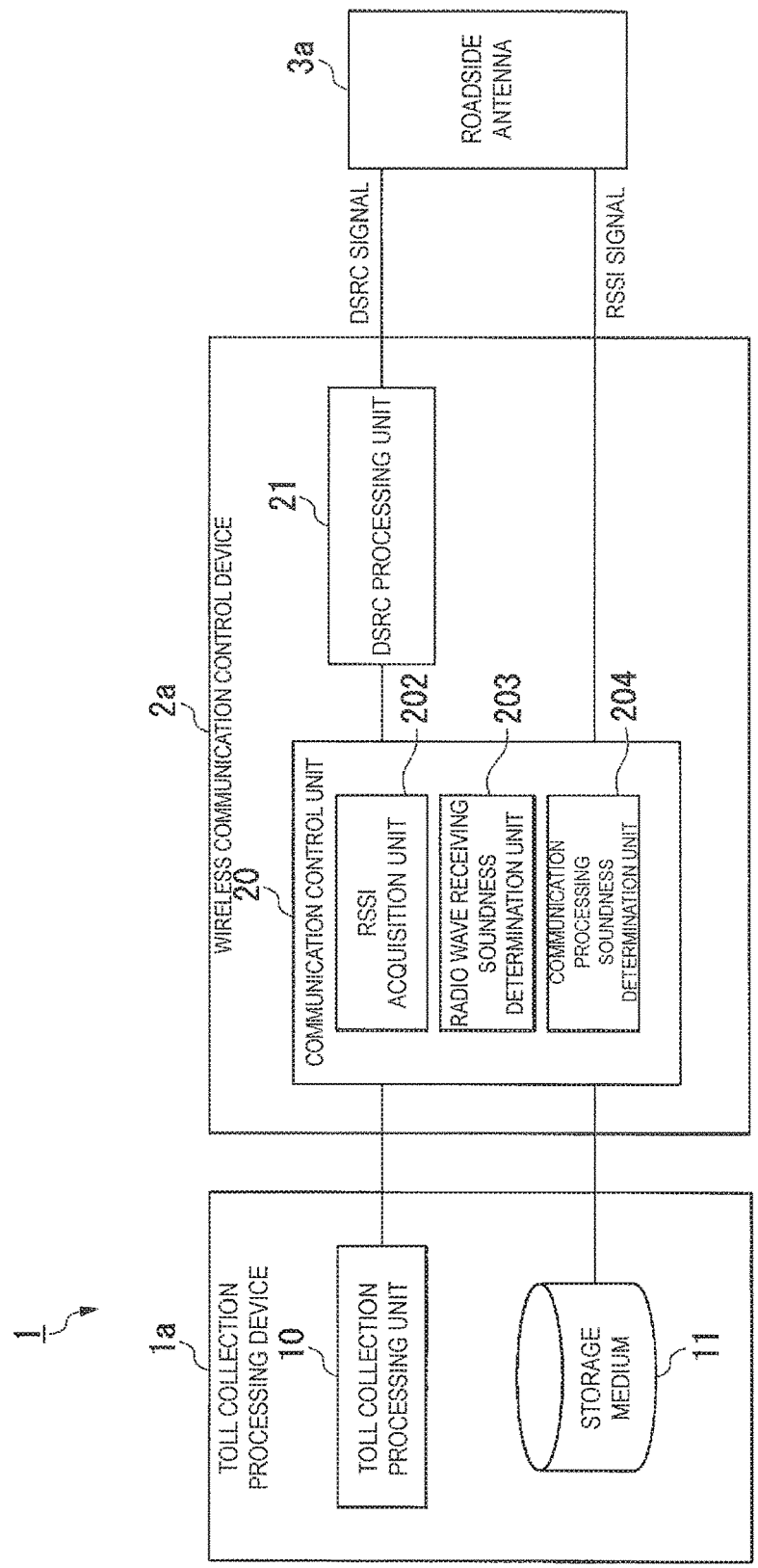
FIG. 12 is a diagram illustrating the functional elements of a toll collection system according to Embodiment 3.

FIG. 12 is a diagram illustrating the functional elements of a toll collection system according to Embodiment 3.

In FIG. 12, the same components as those in Embodiments 1 and 2 and various modified examples will be denoted by the same reference symbols, with descriptions thereof omitted.

As illustrated in FIG. 12, the toll collection system 1 according to Embodiment 3, as in Embodiments 1 and 2, includes a toll collection processing device 1a, a wireless communication control device 2a, and a roadside antenna 3a. Note that the toll collection system 1 according to the present embodiment, as in Embodiments 1 and 2, further includes a wireless communication control device 2b and a roadside antenna 3b (refer to FIG. 2), with the illustration of the configuration thereof omitted.

Moreover, the communication control unit 20 of toll collection system 1 according to Embodiment 3 further includes a communication processing soundness determination unit 204.

In a case where the reception strength I of radio waves indicated in the RSSI signal is the reception determination threshold Ih or higher and the results of the dedicated short-range communication processing have not been correctly acquired from the DSRC processing unit 21, the communication processing soundness determination unit 204 determines that at least one of the roadside antennas 3a, 3b or the DSRC processing unit 21 is not operating normally.

Here, the phrase "the results of the dedicated short-range communication processing have not been correctly acquired", for example, means that during the dedicated short-range communication, part of the information not made into reference symbols in radio waves transmitted from the on-board device cannot be correctly decoded, with abnormalities such as CRC errors on the receiver side of radio waves detected.

Figure 13:
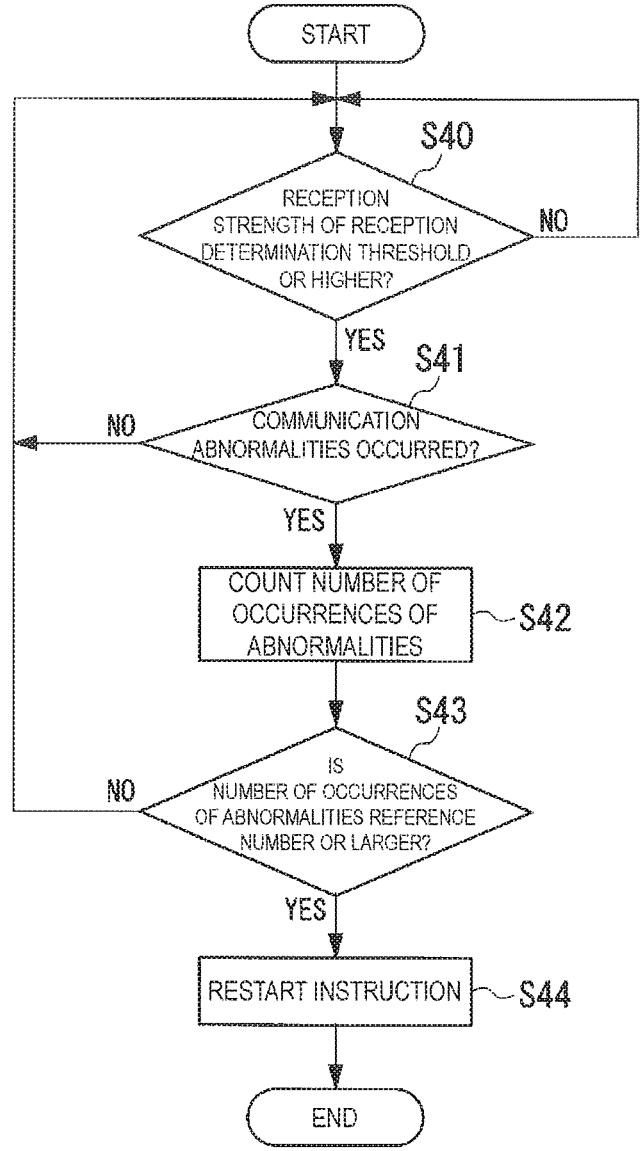
FIG. 13 is a diagram illustrating the processing flow of a communication processing soundness determination unit according to Embodiment 3.

FIG. 13 is a diagram illustrating the processing flow of a communication processing soundness determination unit according to Embodiment 3.

First, the communication processing soundness determination unit 204 determines, based on the RSSI signal acquired by the RSSI acquisition unit 202, whether the reception strength I of the reception determination threshold Ih or higher has been detected (Step S40).

While the reception strength I of the reception determination threshold Ih or higher is not detected (Step S40: NO), processing of Step S40 is repeated and waited.

In contrast, if the reception strength I of the reception determination threshold Ih or higher has been detected (Step S40: YES), the communication processing soundness determination unit 204 acquires the results of the dedicated short-range communication processing carried out by the DSRC processing unit 21 with the on-board device A1 and determines whether abnormalities occur in the results of this dedicated short-range communication processing (Step S41).

If no abnormalities have occurred in the results of the dedicated short-range communication processing by the DSRC processing unit 21 (Step S41: NO), the communication processing soundness determination unit 204 returns to Step S40 and again waits for the detection of the reception strength I of the reception determination threshold Ih or higher. Here, the communication processing soundness determination unit 204, for example, refers to the CRC (FIG. 3) contained in the ACTC signal and the like as the results of the dedicated short-range communication processing by the DSRC processing unit 21 and determines whether it is a telegraphic message in accordance with the ARIB specifications.

In contrast, if abnormalities have occurred in the results of the dedicated short-range communication processing by the DSRC processing unit 21 (Step S41: YES), the communication processing soundness determination unit 204 counts the number of occurrences of abnormalities in the results of this dedicated short-range communication processing (Step S42). In addition, the communication processing soundness determination unit 204 determines whether the abovementioned number of occurrences of abnormalities is a predetermined reference number (for example, 10 times) or more (Step S43).

Here, if the number of occurrences of abnormalities is not a predetermined reference number or higher (Step S43: NO), the communication processing soundness determination unit 204 returns to Step S40 and again waits for the detection of the reception strength I of the reception determination threshold Ih or higher. In contrast, if the number of occurrences of abnormalities is a predetermined reference number or higher (Step S43: YES), the communication processing soundness determination unit 204 determines that abnormalities have occurred in at least one of the DSRC processing unit 21 or the roadside antenna 3a and instructs the DSRC processing unit 21 and the roadside antenna 3a to restart processing (Step S44).

Operational Effects

As described above, the toll collection system 1 according to Embodiment 3 further includes a communication processing soundness determination unit 204, wherein, if the reception strength I of radio waves indicated in the RSSI signal is the reception determination threshold Ih or higher (Step S40: YES) and the results of the dedicated short-range communication processing have not been correctly acquired from the DSRC processing unit 21 (Step S41: YES), the communication processing soundness determination unit 204 determines that at least one of the roadside antennas 3a, 3b or the DSRC processing unit 21 is not operating normally.

Here, if the reception strength I of radio waves received from the on-board device A1 is lower than the reception determination threshold Ih, because the reception strength I is insufficient, for example, demodulation processing and the like in the demodulation processing unit 34 (FIG. 8) of the roadside antennas 3a, 3b may not be correctly executed (for example, in received radio waves, a reference symbol, which was originally "1", may be mistakenly demodulated to "0"). Therefore, it is contemplated that even if the DSRC processing unit 21 is operating normally, the results of the dedicated short-range communication processing cannot be correctly acquired.

However, the event wherein, even though the reception strength I of radio waves received from the on-board device A1 is sufficient, the results of the dedicated short-range communication processing cannot be correctly acquired from the DSRC processing unit 21 (CRC abnormalities has occurred) has occurred multiple times, abnormalities have likely occurred in at least one of the DSRC processing unit 21 or the roadside antenna 3a (demodulation processing unit 34).

With this, in a case where the number, wherein, even though the reception strength I of radio waves is the reception determination threshold Ih or higher, the results of the dedicated short-range communication processing have not been correctly acquired from the DSRC processing unit 21 is a predetermined reference number or higher, the communication processing soundness determination unit 204 determines, in accordance with the abovementioned processing flow (Step S40 to S44), that at least one of the DSRC processing unit 21 or the roadside antenna 3a is not operating normally. Subsequently, the communication processing soundness determination unit 204 instructs the DSRC processing unit 21 and the roadside antenna 3a to restart processing.

As a result, because abnormalities in the operation of the roadside antennas 3a, 3b or the DSRC processing unit 21 can be further detected using the combination of reception strength (RSSI) of radio waves and the results of the dedicated short-range communication processing of the DSRC processing unit 21, abnormalities in the toll collection system 1 can be further accurately detected.

Note that Embodiment 3 has been described in which, if the communication processing soundness determination unit 204 determines that abnormalities have occurred in at least one of the roadside antennas 3a, 3b or the DSRC processing unit 21, it instructs the roadside antennas 3a, 3b and the DSRC processing unit 21 to restart processing (Step S44 of FIG. 13). However, other embodiments are not limited to this aspect.

For example, other embodiments may include an aspect in which, in a case where the communication processing soundness determination unit 204 determines that the operation of the target components (roadside antennas 3a, 3b and DSRC processing unit 21) has abnormalities, a monitoring person and the like residing in a central facility of the toll collection system 1 and the like is notified of the abnormalities.

Moreover. Embodiment 3 describes that, assuming that abnormalities have not occurred in the on-board device A1 itself for sending radio waves, in a case where the results of the dedicated short-range communication processing have not been correctly acquired from the DSRC processing unit 21 (CRC abnormalities of reference number or higher have been detected), a determination is made that any one of the DSRC processing unit 21 or the roadside antenna 3a is not operating normally.

However, it is contemplated that in a case where the on-board device A1 itself serving as the sender of radio waves has abnormalities, radio waves originally having CRC abnormalities have been sent. In this case, despite abnormalities on the on-board device A1 side, a determination may actually be mistakenly made that the DSRC processing unit 21 or the roadside antenna 3a has abnormalities.

With this, the communication processing soundness determination unit 204 according to a modified example of Embodiment 3 reads the LID of the on-board device A1 from the ACTC signal in which CRC abnormalities have been detected despite the reception strength I being the reception determination threshold Ih or higher and counts the varieties thereof. In addition, in a case where the variety of this LID is a predetermined reference number or higher, the communication processing soundness determination unit 204 may determine that at least one of the DSRC processing unit 21 or the roadside antenna 3a is not operating normally. That is, because it is hard to contemplate that radio waves of CRC abnormalities are sent from multiple on-board devices A1, the occurrence locations of the abnormalities can be narrowed down to the antenna 3a or the DSRC processing unit 21.

Embodiment 4

Subsequently, a toll collection system according to Embodiment 4 will be described in detail with reference to FIG. 14.

Functional Elements of the Toll Collection System

Figure 14:
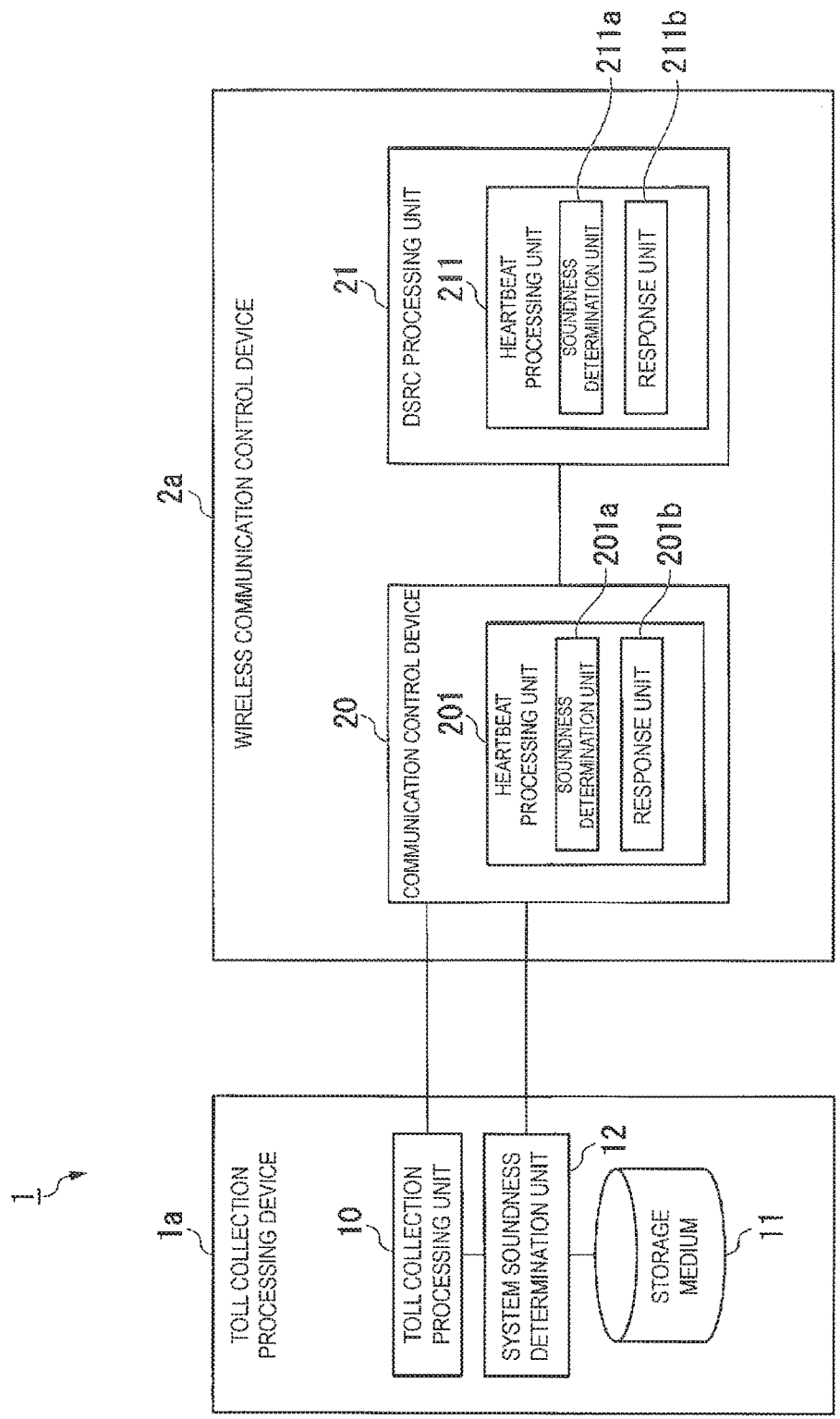
FIG. 14 is a diagram illustrating the functional elements of a toll collection system according to Embodiment 4.

FIG. 14 is a diagram illustrating the functional elements of a toll collection system according to Embodiment 4.

In FIG. 14, the same components as those in Embodiments 1 to 3 and various modified examples will be denoted by the same reference symbols, with descriptions thereof omitted.

As illustrated in FIG. 14, the toll collection system 1 according to Embodiment 4, as in Embodiments 1 and 3, includes a toll collection processing device 1a along with a wireless communication control device 2a. Note that the toll collection system 1 according to the present embodiment, as in Embodiments 1 to 3, further includes a wireless communication control device 2b and roadside antennas 3a, 3b (refer to FIG. 2), with the illustration of the configuration thereof omitted.

Moreover, the toll collection processing device 1a includes a toll collection processing unit 10, a recording medium 11, and a system soundness determination unit 12.

In a case where the number r of toll collection processing executed per unit time is lower than the predetermined reference processing number rh, the system soundness determination unit 12 determines that at least one of various devices (the roadside antennas 3a, 3b, the DSRC processing unit 21, the communication control unit 20, and the toll collection processing unit 10) configuring toll collection system 1 is not operating normally.

More specifically, the system soundness determination unit 12 refers to the statistical data D (FIG. 11) recorded in the recording medium 11 and determines that at least one of various devices (the toll collection processing device 1a, the wireless communication control devices 2a, 2b, and the roadside antennas 3a, 3b) configuring the toll collection system 1 is not operating normally, in a case where the number r of toll collection processing executed per unit time is lower than the reference processing number rh in accordance with the statistical data D.

For example, in a case where the present time is 12:00, the system soundness determination unit 12 refers to the amount driven in this time span of 12:00 from the statistical data D and sets the reference processing number rh in accordance with the amount driven. In addition, the system soundness determination unit 12 counts the number r of toll collection processing executed per unit time in the toll collection processing unit 10, and determines whether the number is lower than the abovementioned reference processing number rh (whether r<rh).

Moreover, in a case where the number r of toll collection processing executed per unit time is lower than the reference processing number rh (r<rh) in accordance with the time span of the present time, the system soundness determination unit 12 determines that at least one of various devices (the toll collection processing device 1a, the wireless communication control devices 2a, 2b, and the roadside antennas 3a, 3b) has abnormalities and gives instructions to restart the processing of various devices configuring the toll collection system 1.

Operational Effects

Here, in specified communication regions Q1, Q2 of the toll collection system 1 (FIG. 1), a vehicle A normally drives at a predetermined frequency (the number of passing vehicles per unit time) in accordance with the user number of an expressway (the amount a vehicle A is driven). Therefore, it is contemplated that in a case where the overall toll collection system 1 functions normally, the toll collection processing unit 10 executes toll collection processing at the frequency of a predetermined reference processing number rh or higher in accordance with the abovementioned number of passing vehicles.

In this case, in a case where the number r of actual toll collection processing executed per unit time is lower than the reference processing number rh, abnormalities by which "although a vehicle A actually passes through the specified communication regions Q1, Q2, toll collection processing has not been correctly carried out for each vehicle A" are dubious.

With this, as mentioned above, in a case where the number r in which toll collection processing has been executed per unit time is lower than the predetermined reference processing number rh, the system soundness determination unit 12 determines that at least one of various devices configuring the toll collection system 1 is not operating normally. In addition, the system soundness determination unit 12 instructs overall various devices to restart processing.

For example, it is contemplated that in accordance with the aspect of operation abnormalities which may occur in the communication control unit 20, only part of each process executed by the communication control unit 20 has abnormalities. In this case, it is presumed that although processing (creation of information for toll collection with regard to the on-board device A1) which should be originally carried out by the communication control unit 20 is not normally carried out, the heartbeat processing unit 201 functions normally. In this case, in the heartbeat processing unit 211 of the DSRC processing unit 21, abnormalities which have occurred in this communication control unit 20 cannot be detected.

In accordance with the toll collection system 1 according to the present embodiment, even in such a case, because a determination can be made, based on the number of the actual toll collection processing carried out in the toll collection processing unit 10, regarding whether abnormalities occur in any one of various devices configuring the toll collection system 1, abnormalities of the toll collection system 1 can be more accurately detected.

Note that in the toll collection system 1 according to a modified example of Embodiment 4, an aspect of the statistical data D may indicate the amount driven not only for each time span of one day, but also, for example, for each time span of one month or one year.

Moreover, in the toll collection system 1 according to another modified example of Embodiment 4, the reference processing number rh does not change in accordance with the statistical data D, but may be a predetermined constant value.

In the Embodiments 1 to 4 described above, various processes are implemented by a program for achieving the various functions of the toll collection system 10, the communication control unit 20, the DSRC processing unit 21, and the roadside antennas 3a, 3b. The program is recorded on a computer-readable recording medium and the program recorded on the recording medium is read and executed by a computer system. Additionally, the steps of each process of the toll collection system 10, the communication control unit 20, the DSRC processing unit 21, and the roadside antennas 3a, 3b described above are stored in a computer-readable recording medium in the form of a program and these various processes are implemented by the computer reading out and executing this program. Examples of the computer-readable recording medium include magnetic disks, magneto-optical disks, CD-ROMs, DVD-ROMs, and semiconductor memories. This computer program may be distributed to the computer on a communication circuit and the computer receiving this distribution may execute the program.

None of the toll collection system 10, the communication control unit 20, the DSRC processing unit 21, and the roadside antennas 3a, 3b are limited to the aspect in which the various functional elements are encased in a single device casing. The various functional elements of each of the toll collection system 10, the communication control unit 20, the DSRC processing unit 21, and the roadside antennas 3a, 3b may be distributed in a plurality of network-connected devices.

Embodiment 5

Subsequently, a toll collection system according to Embodiment 5 will be described in detail with reference to FIGS. 15 to 22.
Overall Configuration of the Toll Collection System
FIG. 15 is a diagram illustrating the overall configuration of a toll collection system according to Embodiment 5.

Figure 15:
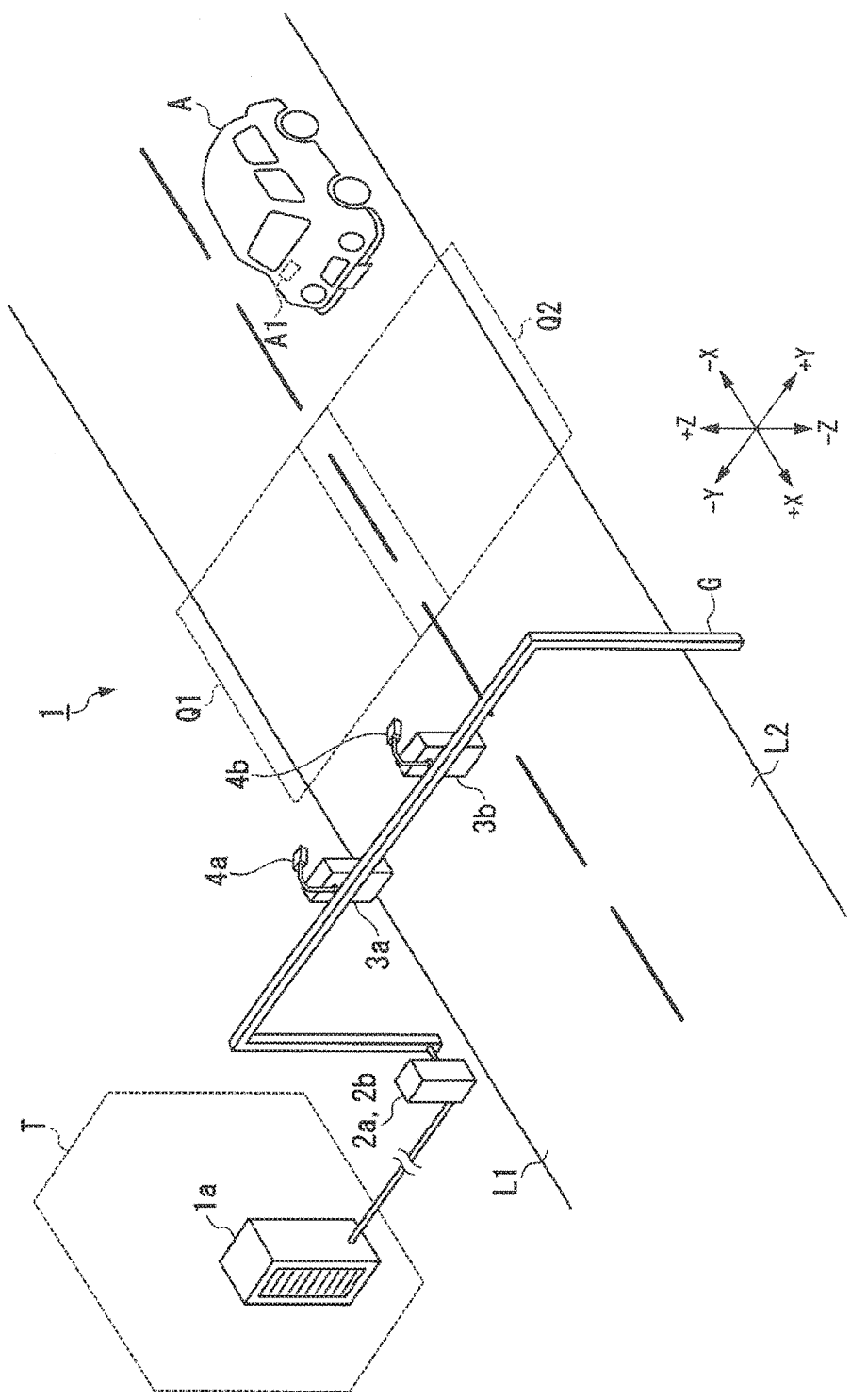
FIG. 15 is a diagram illustrating the overall configuration of a toll collection system according to Embodiment 5.

As illustrated in FIG. 15, the toll collection system 1 includes a toll collection processing device 1a, wireless communication control devices 2a, 2b, roadside antennas 3a, 3b, and confirmation apparatuses 4a, 4b. In the present embodiment, the toll collection processing device 1a, the wireless communication control devices 2a, 2b, and the roadside antennas 3a, 3b are the same as in Embodiments 1 to 4.

Moreover, in the present embodiment, as illustrated in FIG. 15, the confirmation apparatuses 4a, 4b are respectively attached to the roadside antennas 3a, 3b.
Functional Elements of the Toll Collection System
FIG. 16 is a diagram illustrating the functional elements of the toll collection system according to Embodiment 5.

Figure 16:
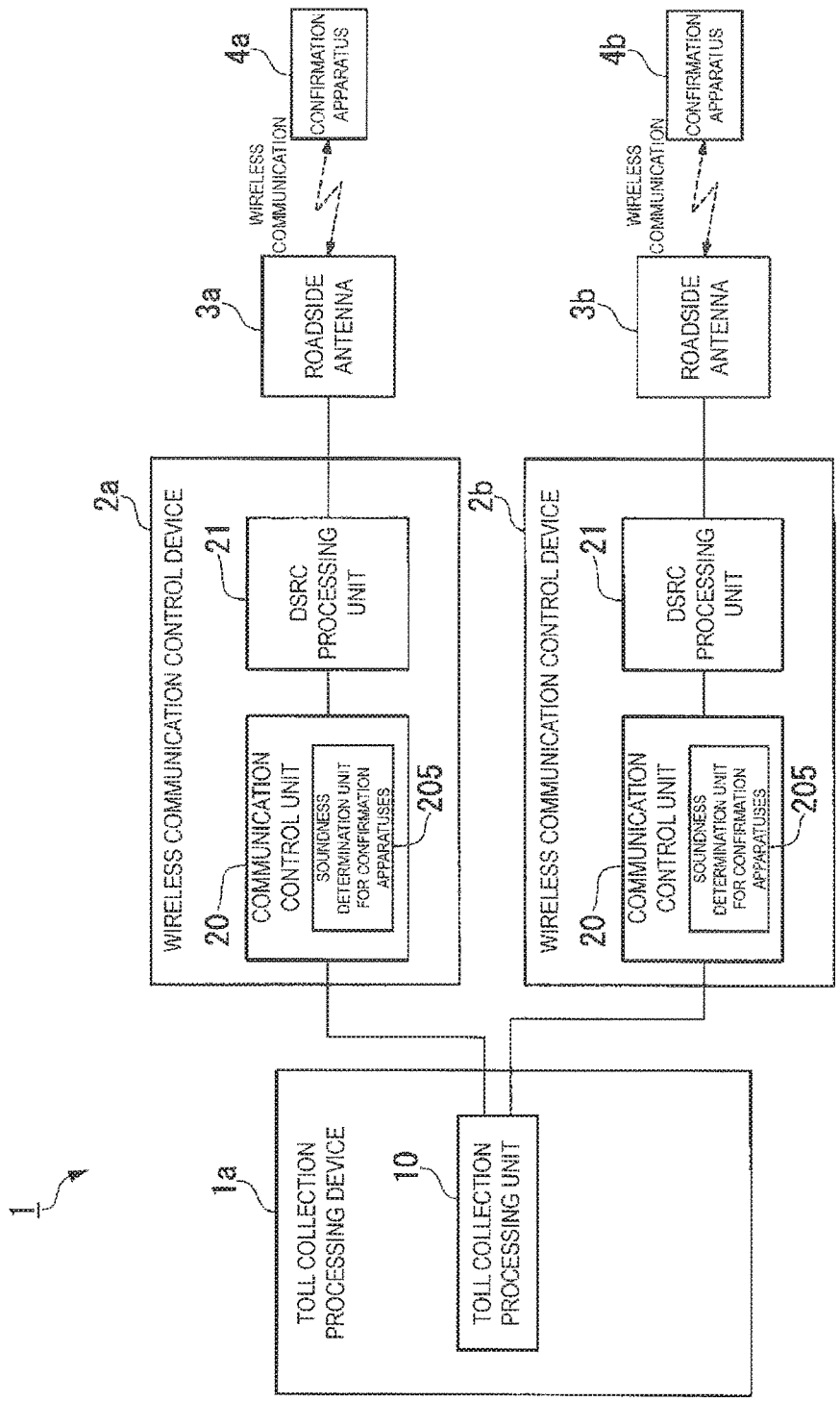
FIG. 16 is a diagram illustrating the functional elements of the toll collection system according to Embodiment 5.

As illustrated in FIG. 16, the toll collection processing device 1a includes a toll collection processing unit 10. Moreover, each of the wireless communication control devices 2a, 2b includes a communication control unit 20 along with a DSRC processing unit 21 (communication processing unit).

As illustrated in FIG. 16, the toll collection processing device 1a of the toll collection system 1 includes a toll collection processing unit 10. Moreover, each of the wireless communication control devices 2a, 2b includes a communication control unit 20 along with a DSRC processing unit 21 (communication processing unit).

The confirmation apparatuses 4a, 4b are disposed within a range in which wireless communication with each of the roadside antennas 3a. 3b is possible, receive confirmation signals (FCMC signals) from each of the roadside antennas 3a, 3b, and transmit response signals (ACTC signals).

The communication control unit 20 according to the present embodiment includes a soundness determination unit 205 as a confirmation apparatus. The soundness determination unit 205 as a confirmation apparatus determines whether the roadside antennas 3a, 3b and the wireless communication control devices 2a, 2b are operating normally based on the reception results of the response signal (ACTC signal) from the confirmation apparatuses 4a, 4b via the roadside antennas 3a. 3b.

Note that the toll collection processing unit 10, the communication control unit 20, the DSRC processing unit 21, and the roadside antennas 3a, 3b according to Embodiment 5 are described as including heartbeat processing units (heartbeat processing units 101, 201, 211, and the like) described in Embodiment 1 and a modified example thereof. Moreover, the communication control unit 20 according to Embodiment 5 is described as not including the radio wave receiving soundness determination unit 203 and the communication processing soundness determination unit 204 described in Embodiment 2 and a modified example thereof, as well as Embodiment 3.

However, other embodiments may include an aspect in which the toll collection system 1 includes one or more of heartbeat processing units 101, 201, 211, a radio wave receiving soundness determination unit 203, or a communication processing soundness determination unit 204, wherein the soundness determination unit for confirmation apparatuses 205 according to Embodiment 5 determines the soundness of the operation of the overall toll collection system 1 in combination with these various functional elements.
Structure of the Roadside Antenna and the Confirmation Apparatus FIG. 17 is a first diagram illustrating the structure of a roadside antenna and a confirmation apparatus according to Embodiment 5.

Figure 18:
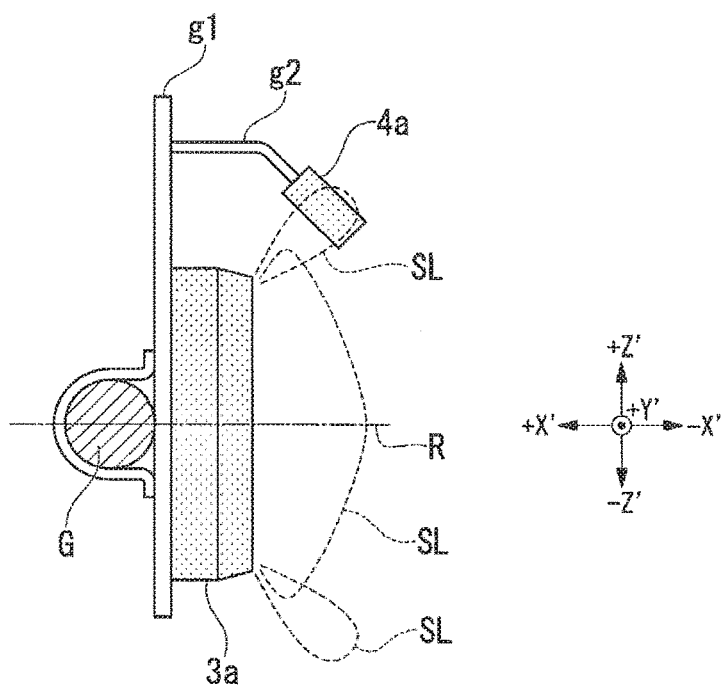
FIG. 18 is a second diagram illustrating the structure of the roadside antenna and the confirmation apparatus according to Embodiment 5.

Moreover, FIG. 18 is a second diagram illustrating the structure of the roadside antenna and the confirmation apparatus according to Embodiment 5.

Figure 17:
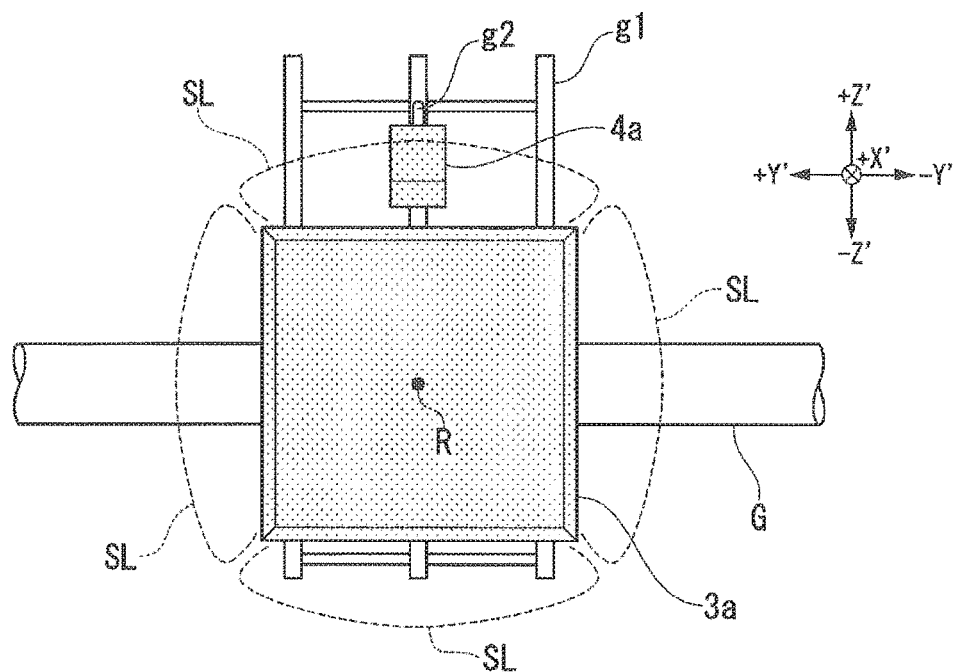
FIG. 17 is a first diagram illustrating the structure of a roadside antenna and a confirmation apparatus according to Embodiment 5.

Here, FIG. 17 illustrates the state in which the roadside antenna 3a is seen from the front face thereof, while FIG. 18 illustrates the state in which the roadside antenna 3a is seen from the side face thereof.

Note that the ±Y' direction in FIGS. 17 and 18 is the direction parallel to the plate surface of the roadside antenna 3a formed in a rectangular plate shape and also parallel to the road surface of the lane L1 (refer to FIG. 15). Moreover, the +Z' direction is the direction parallel to the plate surface of the roadside antenna 3a and also the direction towards the upper side of the roadside antenna 3a (direction distant from the road surface of the lane L1 (refer to FIG. 15)). Moreover, the −X' direction in FIGS. 17 and 18 is the direction perpendicular to the plate surface of the roadside antenna 3a and also the direction towards specified communication region Q1 (refer to FIG. 15) on the road surface of the lane L1.

As illustrated in FIGS. 17 and 18, the roadside antenna 3a and confirmation apparatus 4a are fixed and installed to the gantry G via attachment jig g1.

The roadside antenna 3a has a main lobe (the range in which the radiation amount of radio waves in the target direction is the highest of the radiation patterns of the antenna) (not illustrated in FIGS. 17 and 18) in accordance with the specified communication region Q1 (FIG. 15) on the road surface of the lane L1. Here, the main lobe of the roadside antenna 3a, for example, is a predetermined range on the front side (Y'Z' plane) on the plate surface (direction (−X' direction) side towards specified communication region Q1), with the central axis line R of this plate surface serving as the center.

Moreover, the roadside antenna 3a includes a side lobe SI, having a radiation pattern of unnecessary radio waves occurring in a different direction from the main lobe. For example, as illustrated in FIGS. 17 and 18, with the vicinity of each edge (side) on a rectangular plate surface of the roadside antenna 3a serving as the base end, the side lobe SL of the roadside antenna 3a extends on the front side thereof (−X' direction side) and in a direction moving away from the central axis line R on this plate surface.

The confirmation apparatus 4a is disposed at a position capable of receiving the radio waves of the side lobe SL of the roadside antenna 3a. Specifically, the confirmation apparatus 4a is attached to the tip of a fixing rod g2, which is on the upper side (+Z' direction side) on the plate surface of the roadside antenna 3a and extends from the back side thereof (+X' direction side) to the front side thereof (−X' direction side). Consequently, the confirmation apparatus 4a is disposed on the upper side (+Z' direction side) and the front side (−X' direction side) on the plate surface of the roadside antenna 3a.

Note that in FIGS. 17 and 18, the structure and positional relationship of the roadside antenna 3a and the confirmation apparatus 4a have been described, with the structure and positional relationship of the roadside antenna 3b and the confirmation apparatus 4b being the same as these.

Functions of Confirmation Apparatus

Figure 19:
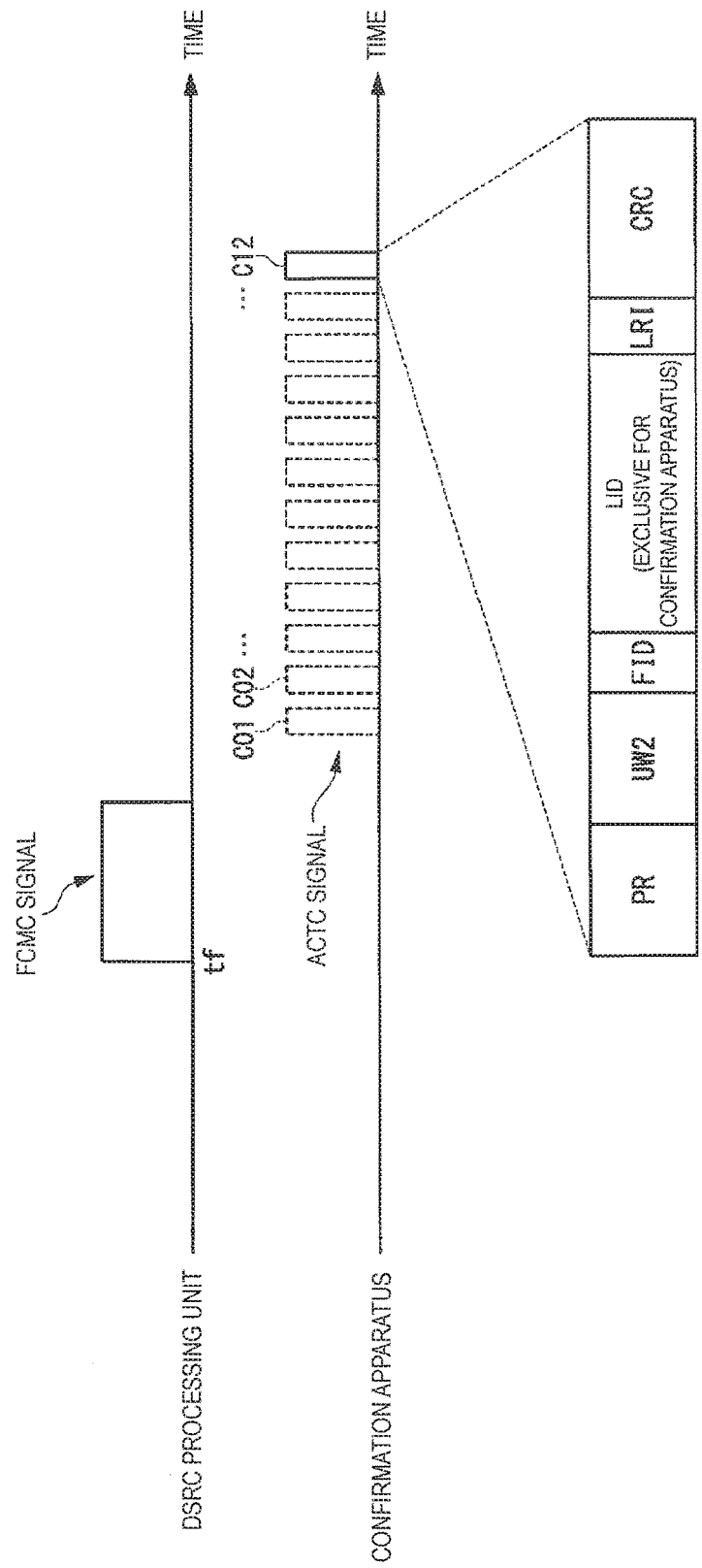
FIG. 19 is a diagram explaining the functions of the confirmation apparatus according to Embodiment 5.

FIG. 19 is a diagram explaining the functions of the confirmation apparatus according to Embodiment 5.

FIG. 19 illustrates the contents of communication processing carried out between the DSRC processing unit 21 of the wireless communication control device 2a and the confirmation apparatus 4a.

As the normal processing, in order to set a vehicle A (on-board device A1) located in the specified communication region Q1 to the communication target, the DSRC processing unit 21 transmits the FCMC signal from a certain time tf. Here, the FCMC signal is a predetermined request signal transmitted by the wireless communication control devices 2a, 2b to the on-board device A1 via the roadside antennas 3a, 3b in the dedicated short-range communication processing based on the abovementioned ARIB standard specifications. The wireless communication control devices 2a, 2b transmit an FCMC signal (request signal) and request the return of the ACTC signal from the on-board device A1.

In a case where the on-board device A1 is present in the specified communication region Q1, radio waves overlapped by this FCMC signal are received by this on-board device A1 via the main lobe of the roadside antenna 3a. In addition, this on-board device A1 returns an ACTC signal serving as a response signal to this FCMC signal.

In contrast, radio waves overlapped by the FCMC signal are radiated to the side lobe SL of the roadside antenna 3a. Consequently, the confirmation apparatus 4a disposed in the positional relationship illustrated in FIGS. 17 and 18 receives the FCMC signal via the side lobe SL of the roadside antenna 3a.

The confirmation apparatus 4a which receives the FCMC signal transmits the ACTC signal, as a response signal to this FCMC signal, through radio waves, at the timing of any one of 12 channels C01 to C12. In addition, the confirmation apparatus 4a assigns, to the ACTC signal to be transmitted here, an identifier (which is the LID exclusive to the confirmation apparatus allocated inherently in the confirmation apparatus 4a and can identify that the transmission source of this ACTC signal is this confirmation apparatus 4a).

Processing Flow of the Soundness Determination Unit for Confirmation Apparatuses FIG. 5 is a diagram explaining the processing flow of a soundness determination unit for confirmation apparatuses according to Embodiment 5.

First, the soundness determination unit for confirmation apparatuses 205 of the wireless communication control device 2a detects the transmission of the FCMC signal serving as the confirmation signal from the DSRC processing unit 21 (Step S50). At this time, the FCMC signal transmitted from the DSRC processing unit 21 is transmitted to the confirmation apparatus 4a via the side lobe SL of the roadside antenna 3a (FIGS. 17 and 18).

Here, in accordance with the reception of the FCMC signal, the confirmation apparatus 4a transmits an ACTC signal (refer to FIG. 19) with the LID (LID exclusive to the confirmation apparatus) inherent in the confirmation apparatus 4a assigned thereto. The soundness determination unit for confirmation apparatuses 205 refers to the LID assigned to the ACTC signal received via the DSRC processing unit 21 and determines whether it has been received from the confirmation apparatus 4a (Step S51).

If a response signal (ACTC signal) to the FCMC signal has been received from the confirmation apparatus 4a (Step S51: YES), the soundness determination unit for confirmation apparatuses 205 returns to Step S50 and again detects the transmission of the FCMC signal.

In contrast, if the ACTC signal has not been received from the confirmation apparatus 4a despite the transmission of the FCMC signal from the DSRC processing unit 21 (Step S51: NO), the soundness determination unit for confirmation apparatuses 205 counts the number (confirmation apparatus nonresponse number) of times a response from the confirmation apparatus 4a has not been detected (Step S52). In addition, the soundness determination unit for confirmation apparatuses 205 determines whether the abovementioned confirmation apparatus nonresponse number is a predetermined reference number (for example, 10 times) or more (Step S53).

Here, if the confirmation apparatus nonresponse number is not the predetermined reference number or higher (Step S53: NO), the soundness determination unit for confirmation apparatuses 205 returns to Step S50 and again detects the transmission of the FCMC signal. In contrast, if confirmation apparatus nonresponse number is the predetermined reference number or higher (Step S53: YES), the soundness determination unit for confirmation apparatuses 205 determines that abnormalities have occurred in at least one of the DSRC processing unit 21 or the roadside antenna 3a and instructs the DSRC processing unit 21 and the roadside antenna 3a to restart processing (Step S54).

Operational Effects

As described above, the toll collection system 1 according to Embodiment 5 is provided with: roadside antennas 3a, 3b that wirelessly communicate with an on-board device A1 mounted in a vehicle A; wireless communication control devices 2a, 2b that carry out predetermined communication processing (narrow band communication processing) with the on-board device A1 via the roadside antennas 3a, 3b, and acquire toll collection information with regard to the on-board device A1; and confirmation apparatuses 4a, 4b that are disposed within a range in which the wireless communication with roadside antennas 3a, 3b is possible, receiving an FCMC signal from the roadside antennas 3a, 3b and transmitting an ACTC signal. Moreover, the wireless communication control devices 2a, 2b determine whether the roadside antennas 3a, 3b and the wireless communication control devices 2a, 2b are operating normally based on the reception results of the ACTC signal from the confirmation apparatuses 4a, 4b via the roadside antennas 3a, 3b.

That is, every time the wireless communication control devices 2a, 2b transmit the FCMC signal towards the on-board device A1, the confirmation apparatuses 4a, 4b permanently disposed within a communicable range thereof receive this FCMC signal and transmit (return) the response signal (ACTC signal) in accordance with the FCMC signal. Thereby, in accordance with the presence of the reception of the response signal from the confirmation apparatuses 4a, 4b, a determination can be made regarding whether the wireless communication control devices 2a, 2b and the roadside antennas 3a, 3b are operating normally.

Consequently, in accordance with the toll collection system 1 according to Embodiment 5, in a free flow type toll collection system, abnormalities can be quickly and accurately detected.

Moreover, in the toll collection system 1 according to Embodiment 5, the confirmation apparatuses 4a, 4b are disposed within a range in which wireless communication with the roadside antennas 3a, 3b via the side lobe of the roadside antennas 3a. 3b is possible.

Here, as mentioned above, the main lobes of the roadside antennas 3a, 3b respectively specify specified communication regions Q1, Q2 on the road surfaces of the lanes L1, L2. In this case, it is contemplated that, for example, if the confirmation apparatuses 4a, 4b are permanently disposed in the vicinity of the roadside antennas 3a, 3b and also within the range of the main lobe, the radiation pattern of this main lobe is influenced (reflected, and the like) by the existence of the confirmation apparatuses 4a, 4b, with the specified communication regions Q1, Q2 varying from the intended regions.

With that, as in the toll collection system 1 according to the present embodiment, in a case where the confirmation apparatuses 4a. 4b are disposed at positions in which wireless communication is possible via the side lobe of the roadside antennas 3a. 3b, wireless communication processing between the roadside antennas 3a, 3b and the confirmation apparatuses 4a, 4b can be stably carried out without influencing the main lobe of the roadside antennas 3a, 3b itself.

Therefore, without impairing the range of the specified communication regions Q1, Q2, that is, the stability of the dedicated short-range communication processing carried out between the roadside antennas 3a, 3b and the on-board device A1, in accordance with the reception results of the response signal from the confirmation apparatuses 4a, 4b, a determination can be made regarding whether the wireless communication control devices 2a, 2b and the roadside antennas 3a, 3b are operating normally.

Moreover, the confirmation apparatuses 4a, 4b according to Embodiment 5 transmit the response signal as a confirmation signal from the roadside antennas 3a, 3b in a case where the dedicated short-range communication processing the wireless communication control devices 2a, 2b have received the request signal (FCMC signal) transmitted to the on-board device A1. Moreover, the confirmation apparatuses 4a, 4b transmit a response signal (ACTC signal) based on the same specifications (ARIB standard specifications) as the response signal transmitted by the on-board device A1 during dedicated short-range communication processing, as a response signal thereof.

That is, the toll collection system 1 according to the present embodiment also uses the FCMC signal and ACTC signal exchanged with on-board device A1 during normal dedicated short-range communication processing, for wireless communication processing for soundness determination carried out between the confirmation apparatuses 4a, 4b. In this case, the wireless communication control devices 2a, 2b can transmit and receive the confirmation signal and the response signal between the confirmation apparatuses 4a, 4b only via the existing DSRC processing unit 21.

Therefore, because the need to implement a novel component (hardware) is eliminated in order to carry out wireless communication processing between the confirmation apparatuses 4a, 4b and the roadside antennas 3a, 3b, a determination can be made regarding whether the roadside antennas 3a, 3b are operating normally, while suppressing the increase in production costs of the toll collection system 1.

Moreover, the confirmation apparatuses 4a, 4b according to Embodiment 5 include an identifier (LID exclusive for the confirmation apparatus) which can identify that the transmission source of this ACTC signal is the confirmation apparatuses 4a, 4b in the ACTC signal, which is transmitted in a case where the FCMC signal is received.

As a result, simply by referring to the LID read from the ACTC signal via the dedicated short-range communication processing by the DSRC processing unit 21, the soundness determination unit for confirmation apparatuses 205 can determine whether this ACTC signal has been transmitted from the confirmation apparatuses 4a, 4b.

Modified Example of Embodiment 5

Figure 21:
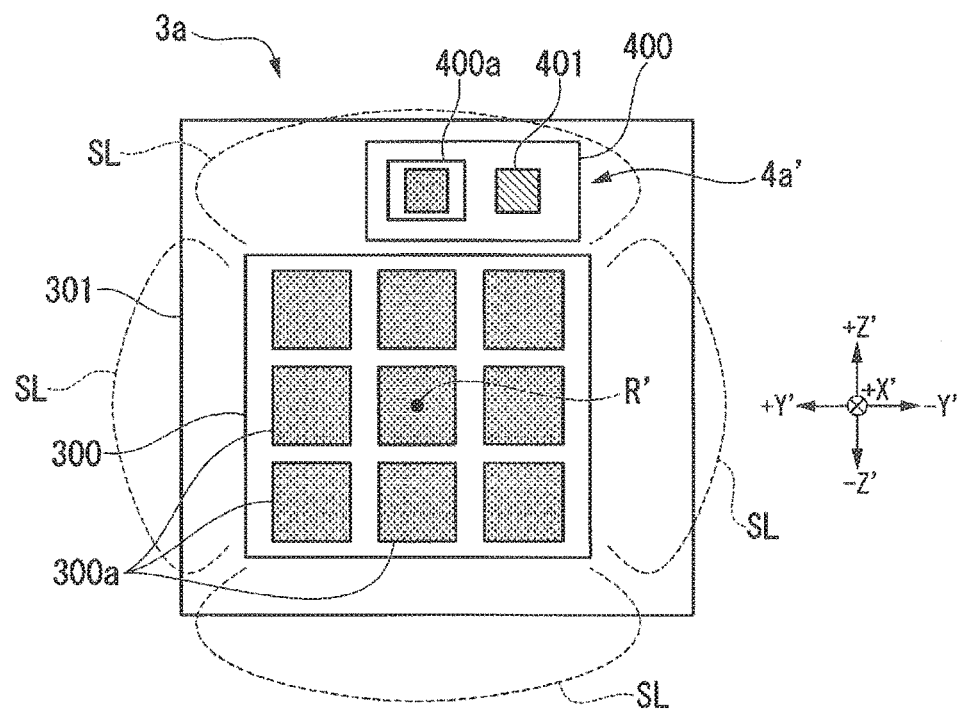
FIG. 21 is a first diagram illustrating the structure of a roadside antenna and a confirmation apparatus according to a modified example of Embodiment 5.

FIG. 21 is a first diagram illustrating the structure of a roadside antenna and a confirmation apparatus according to a modified example of Embodiment 5.

Figure 22:
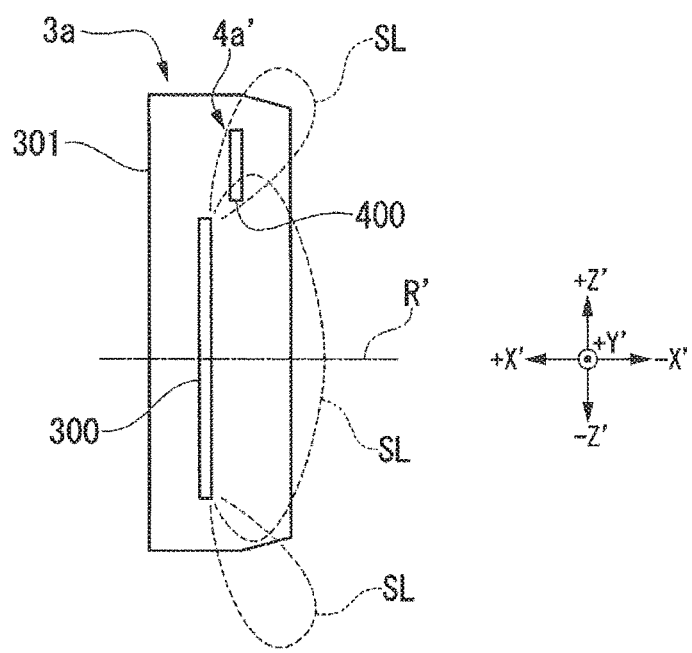
FIG. 22 is a second diagram illustrating the structure of the roadside antenna and the confirmation apparatus according to a modified example of Embodiment 5.

Moreover, FIG. 22 is a second diagram illustrating the structure of the roadside antenna and the confirmation apparatus according to a modified example of Embodiment 5.

Here. FIG. 21 illustrates the state in which the internal structure of the roadside antenna 3a is seen from the front face of thereof, while FIG. 22 illustrates the state in which the internal structure of the roadside antenna 3a is seen from the side face thereof.

As illustrated in FIGS. 21 and 22, roadside antenna 3a includes: a substrate 300 for a patch antenna with the patch antenna 300a formed on the plate surface; and a radome 301 for covering the patch antenna 300a (the substrate 300 for a patch antenna).

Moreover, the radome 301 of the roadside antenna 3a is further formed so as to cover a confirmation apparatus 4a'. Here, unlike the confirmation apparatus 4a (FIGS. 17 and 18) according to Embodiment 5, the confirmation apparatus 4a' according to the present modified example, which is disposed inside the radome 301, does not have a radome (cover case) of the confirmation apparatus 4a' alone and is simply configured by a substrate 400 for a confirmation apparatus with a patch antenna 400a and a confirmation apparatus processing unit 401 implemented therein. Here, the confirmation apparatus processing unit 401 is a communication processing unit for carrying out communication processing as the confirmation apparatus 4a' (reading the received FCMC signal and transmitting the ACTC signal).

The patch antenna 300a of the roadside antenna 3a is an antenna element of the roadside antenna 3a (antenna element 30 illustrated in FIG. 8) which is an element for transmitting and receiving radio waves with the on-board device A1.

The patch antenna 300a has a main lobe (not illustrated in FIGS. 21 and 22) in accordance with the specified communication region Q1 (FIG. 15) on the road surface of the lane L1. Here, the main lobe of the patch antenna 300a, for example, is a predetermined range on the front side (−X' direction side) of the plate surface (Y'Z' plane) of the substrate 300 for a patch antenna, with the central axis line R' of this plate surface serving as the center.

Moreover, the patch antenna 300a includes a side lobe SL having a different radiation pattern from the main lobe. For example, as illustrated in FIGS. 21 and 22, with the vicinity of each edge (side) on a rectangular plate surface of the substrate 300 for a patch antenna serving as the base end, the side lobe SL of the patch antenna 300a extends to the front side thereof (−X' direction side) and in a direction moving away from the central axis line R on this plate surface.

The patch antenna 400a of the confirmation apparatus 4a' is an antenna element capable for transmitting and receiving radio waves with the patch antenna 300a of the roadside antenna 3a.

The patch antenna 400a of the confirmation apparatus 4a' is disposed at a position capable of receiving radio waves of the side lobe SL of the patch antenna 300a. For example, the confirmation apparatus 4a' (patch antenna 400a) is disposed so as to be inside the radome 301 of the roadside antenna 3a and also be included within the range of the side lobe SL on the upper side of the substrate 300 for a patch antenna (+Z' direction side).

Note that in FIGS. 21 and 22, the structure and positional relationship of the roadside antenna 3a and the confirmation apparatus 4a have been described, while the structure and positional relationship of the roadside antenna 3b and the confirmation apparatus 4b' (confirmation apparatus disposed inside the radome 301 of the roadside antenna 3b) are the same as these.

As described above, in accordance with the toll collection system 1 according to a modified example of Embodiment 5, the roadside antennas 3a, 3b include: a patch antenna 300a for transmitting and receiving radio waves with the on-board device A1; and a radome 301 for covering this patch antenna 300a, with the confirmation apparatuses 4a', 4b' disposed inside the radome 301.

As a result, because the roadside antennas 3a, 3b and the confirmation apparatuses 4a', 4b' can be integrally formed, the toll collection system 1 can be simplified. That is, because the confirmation apparatuses 4a', 4b' are housed in the radome 301 and integrated with the roadside antennas 3a, 3b, an attachment operator can attach the roadside antennas 3a, 3b with no regard of the existence of the confirmation apparatuses 4a', 4b'. Moreover, an attachment operator need not worry about the displacement between the confirmation apparatus 3a, 3b and the confirmation apparatuses 4a', 4b', and the like.

Moreover, housings (cover cases) of the confirmation apparatuses 4a', 4b', as well as fixing jigs (attachment jig g1, fixing rod g2, and the like) for attaching these confirmation apparatuses 4a', 4b' outside the roadside antennas 3a, 3b, are unnecessary, effectively reducing production costs.

In the foregoing, the toll collection system 1 according to Embodiment 5 and a modified example thereof have been described in detail. However, specific aspects of the toll collection system 1 according to Embodiment 5 and a modified example thereof are not limited to those described above, with various design modifications, for example, capable of being made without departing from the gist thereof.

For example, while the toll collection system 1 according to Embodiment 5 has been described in which the confirmation apparatuses 4a, 4b are disposed within a range in which wireless communication with the roadside antennas 3a, 3b via the side lobe of the roadside antennas 3a, 3b is possible, other embodiments are not limited to this aspect.

For example, other embodiments may include an aspect in which the confirmation apparatuses 4a, 4b are disposed within the range of the main lobe of the roadside antennas 3a, 3b. In this case, the confirmation apparatuses 4a, 4b may be disposed at a position relatively distant from the roadside antennas 3a, 3b (for example, within a range of the specified communication regions Q1, Q2 on the road surfaces of the lanes L1, L2), which is also a position (for example, a roadside band adjacent to the lanes L1, L2, etc.) not inhibiting the driving of a vehicle A. Moreover, the confirmation apparatuses 4a, 4b may be embedded inside the roads of the lanes L1, L2.

Moreover, the toll collection system 1 according to Embodiment 5 (and the modified example thereof) has been described in which the confirmation apparatuses 4a, 4b (confirmation apparatuses 4a', 4b') transmit the response signal as a confirmation signal in a case where the dedicated short-range communication processing wireless communication control devices 2a, 2b have received the FCMC signal transmitted to on-board device A1. Moreover, the confirmation apparatuses 4a, 4b (confirmation apparatuses 4a', 4b') have been described as transmitting a response signal (ACTC signal) based on the same specifications as the response signal transmitted by the on-board device A1 during dedicated short-range communication processing, as a response signal thereof. However, other embodiments are not limited to this aspect.

For example, the confirmation apparatuses 4a, 4b (confirmation apparatuses 4a', 4b') may carry out wireless communication processing between the roadside antennas 3a, 3b exclusive for soundness determination (the transmission and reception of a confirmation signal exclusive for soundness determination, and a response signal exclusive for soundness determination) different from narrow band communication.

Moreover, while the toll collection system 1 according to Embodiment 5 (and a modified example thereof) has been described in which the confirmation apparatuses 4a, 4b (confirmation apparatuses 4a', 4b') select any one period of channels C01 to C12 and transmit the ACTC signal, other embodiments are not limited to this aspect.

For example, this may include an aspect in which the confirmation apparatuses 4a, 4b (confirmation apparatuses 4a', 4b') constantly transmit the response signal using only a specific channel (for example, channel C12) exclusive to the response of the confirmation apparatuses 4a. 4b (confirmation apparatuses 4a', 4b'). As a result, the soundness determination unit for confirmation apparatuses 205 may monitor only the specific channel (channel C12) exclusive to the response of the confirmation apparatuses 4a, 4b (confirmation apparatuses 4a', 4b') and determine whether the response signal has been received from the confirmation apparatuses 4a, 4b (confirmation apparatuses 4a', 4b'), allowing a reduction in the load of soundness determination processing.

Moreover, processing of the DSRC processing unit 21 according to Embodiment 5 (and the modified example thereof), for example, may be carried out as follows.

That is, in a case where the DSRC processing unit 21 reads the ACTC signal received following the transmission of the FCMC signal, it refers to the LID contained in this ACTC signal and determines whether this ACTC signal has been transmitted from the on-board device A1 or transmitted by the confirmation apparatuses 4a, 4b (confirmation apparatuses 4a', 4b'). In a case where the ACTC signal transmitted from on-board device A1 has been received, the DSRC processing unit 21 establishes a data link with this on-board device A1 via the subsequent narrow band communication and acquires information for toll collection. In contrast, in a case where the ACTC signal transmitted from the confirmation apparatuses 4a, 4b (confirmation apparatuses 4a', 4b') has been received, the DSRC processing unit 21 does not establish a data link with the confirmation apparatuses 4a, 4b (confirmation apparatus 4a', 4b'), but rather ends the narrow band communication.

This prevents the DSRC processing unit 21 from carrying out unnecessary dedicated short-range communication processing with the confirmation apparatuses 4a, 4b (confirmation apparatuses 4a', 4b').

Figure 20:
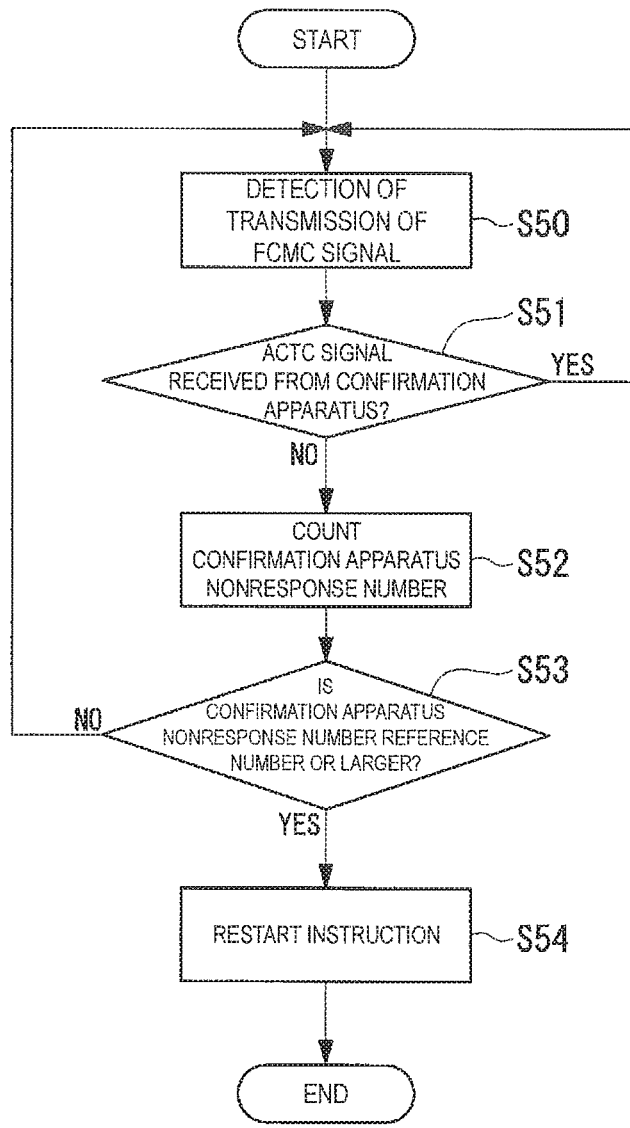
FIG. 20 is a diagram explaining the processing flow of a soundness determination unit for confirmation apparatuses according to Embodiment 5.

Note that Embodiment 5 has been described in which, if the soundness determination unit for confirmation apparatuses 205 determines that abnormalities have occurred in at least one of the roadside antennas 3a, 3b or the DSRC processing unit 21, it instructs the roadside antennas 3a, 3b and the DSRC processing unit 21 to restart processing (Step S54 of FIG. 20). However, other embodiments are not limited to this aspect.

For example, other embodiments may include an aspect in which, in a case where the determination unit 205 for a confirmation apparatus determines that the operation of the target components (roadside antennas 3a, 3b and DSRC processing unit 21) has abnormalities, a monitoring person and the like residing in a central facility of the toll collection system 1 and the like is notified of the abnormalities.

Embodiment 6

Subsequently, a toll collection system according to Embodiment 6 will be described in detail with reference to FIG. 23.

Functional Elements of the Toll Collection System

Figure 23:
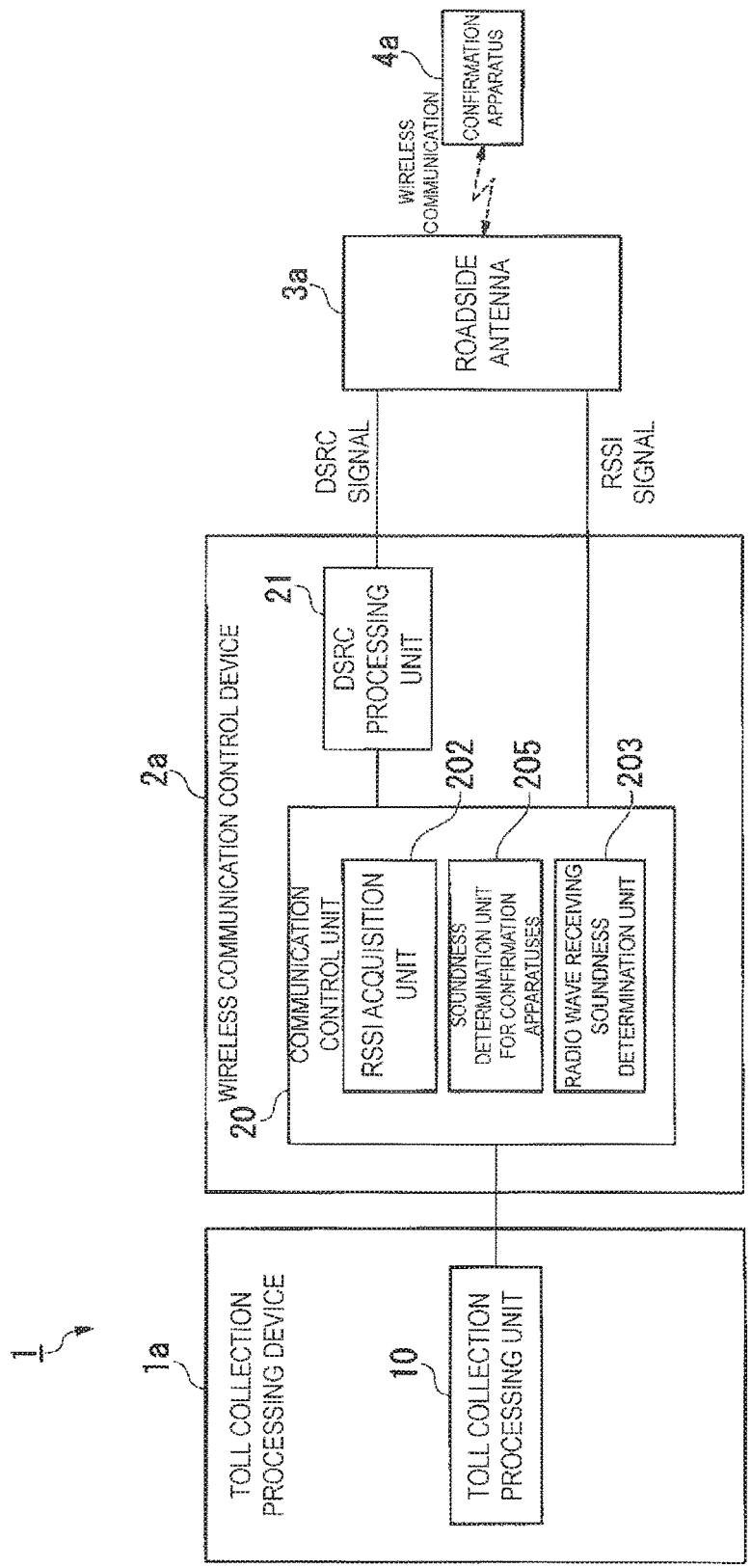
FIG. 23 is a diagram illustrating the functional elements of a toll collection system according to Embodiment 6.

FIG. 23 is a diagram illustrating the functional elements of a toll collection system according to Embodiment 6.

In FIG. 23, the same components as those in Embodiment 5 will be denoted by the same reference symbols, with descriptions thereof omitted.

As illustrated in FIG. 23, the toll collection system 1 according to Embodiment 6, as in Embodiment 5, includes a toll collection processing device 1a, a wireless communication control device 2a, a roadside antenna 3a, and a confirmation apparatus 4a. Note that the toll collection system 1 according to the present embodiment, as in Embodiment 5, further includes wireless a communication control device 2b, a roadside antenna 3b, and a confirmation apparatus 4b (refer to FIG. 16), with the illustration of the configuration thereof omitted.

The wireless communication control device 2a as illustrated in FIG. 25 includes a communication control unit 20 along with a DSRC processing unit 21.

Moreover, as illustrated in FIG. 25, the communication control unit 20 includes a RSSI acquisition unit 202 (reception strength acquisition unit), a radio wave receiving soundness determination unit 203, and a soundness determination unit for confirmation apparatuses 205.

The RSSI acquisition unit 202 according to the present embodiment acquires an RSSI signal (reception strength information) indicating the reception strength (RSSI) of radio waves received by the roadside antennas 3a, 3b, from the roadside antennas 3a, 3b.

Moreover, the radio wave receiving soundness determination unit 203 according to the present embodiment determines whether the roadside antennas 3a, 3b are operating normally based on whether the predetermined reception strength Ic of radio waves indicated in this RSSI signal is lower than the reception determination threshold Ich.

Here, in the toll collection system 1 according to the present embodiment, for example, as in Embodiment 5, the positional relationship between the confirmation apparatuses 4a, 4b and the roadside antennas 3a, 3b is fixed using an attachment jig g1, a fixing rod g2 (FIGS. 17 and 18), and the like. Moreover, the strength of radio waves sent by the confirmation apparatuses 4a, 4b according to the present embodiment for the transmission of the ACTC signal is fixed.

In this case, in a case where the roadside antennas 3a, 3b are operating normally, every time the DSRC processing unit 21 transmits a FCMC signal, the roadside antennas 3a, 3b must receive radio waves from the confirmation apparatuses 4a, 4b at a fixed reception strength.

In this case, the radio wave receiving soundness determination unit 203 according to the present embodiment compares the preset reception determination threshold Ich with the reception strength Ic, which is detected every time the FCMC signal is transmitted. Further, in a case where the reception strength Ic, which is detected every time the FCMC signal is transmitted, is lower than the reception determination threshold Ich, the radio wave receiving soundness determination unit 203 counts the number. In addition, the radio wave receiving soundness determination unit 203 determines that the roadside antennas 3a, 3b are not operating normally in a case where the number at which the reception strength Ic is lower than the reception determination threshold Ich reaches a predetermined reference number.

Operational Effects

As described above, the wireless communication control devices 2a, 2b according to Embodiment 6 include: a RSSI acquisition unit 202 for acquiring the RSSI signal indicating the reception strength of radio waves received by roadside antennas 3a, 3b; and a radio wave receiving soundness determination unit 203 for determining whether the roadside antennas 3a, 3b are operating normally based on whether the reception strength Ic of radio waves indicated in this RSSI signal is lower than the reception determination threshold Ich.

As a result, not only based on the presence of the reception of the ACTC signal from the confirmation apparatuses 4a, 4b but also based on the reception strength of radio waves overlapped by the ACTC signal, the wireless communication control devices 2a, 2b can determine whether the roadside antennas 3a, 3b are operating normally. Consequently, the locations of operation abnormalities in the toll collection system 1 can be further narrowed down and specified.

In the foregoing, while certain embodiments of the present invention have been described, these embodiments are merely illustrative and not intended to limit the scope of the invention. These embodiments may be implemented in various other forms, with various omissions, substitutions, and alterations capable of being made without departing from the gist of the invention. These embodiments and modifications are included in the scope and gist of the invention and are also included in the scope of the invention described in the claims and equivalents thereof.

INDUSTRIAL APPLICABILITY

The abovementioned toll collection system and soundness determination method enable the provision of a free flow type toll collection system which can detect abnormalities.

REFERENCE SYMBOLS LIST

1 Toll collection system
1a Toll collection processing device
10 Toll collection processing unit 101 Heartbeat processing unit
101a Soundness determination unit
101b Response unit
11 Recording medium
12 System soundness determination unit
2a, 2b Wireless communication control devices
20 Communication control unit
201 Heartbeat processing unit
201a Soundness determination unit
201b Response unit
202 RSSI acquisition unit (reception strength acquisition unit)
203 Radio wave receiving soundness determination unit
204 Communication processing soundness determination unit
205 Soundness determination unit for confirmation apparatuses
21 DSRC processing unit (communication processing unit)
211 Heartbeat processing unit
211a Soundness determination unit
211b Response unit
3a, 3b Roadside antennas
30 Antenna element
31 Amplifier
32 Mixer
33 Reference oscillation source
34 Demodulation processing unit
35 Reception strength detection unit
300 Substrate for a patch antenna
300a Patch antenna
301 Radome
4a, 4b Confirmation apparatuses
4a', 4b' Confirmation apparatuses
400 Substrate for a confirmation apparatus
400a Patch antenna
401 Confirmation apparatus processing unit
A Vehicle
A1 On-board device
Q1, Q2 Specified communication regions
G Gantry
L1, L2 Lanes
T Communication tower
D Statistical data
P1, P2, P3 Communication pairs
g1 Attachment jig
g2 Fixing rod
SL Side lobe

The invention claimed is:

1. A toll collection system for determining soundness thereof, comprising:
a roadside antenna which wirelessly communicates with an on-board device mounted in a vehicle;
a communication processing unit for carrying out communication processing based on predetermined communication specifications with the on-board device via the roadside antenna;
a communication control unit for acquiring results of communication processing from the communication processing unit and creating information for toll collection with regard to the on-board device; and
a toll collection processing unit for accepting an input of the information for toll collection from the communication control unit and carrying out toll collection processing based on this information for the toll collection,
wherein, in any of a communication pair of the roadside antenna and the communication processing unit, a communication pair of the communication processing unit and the communication control unit, and a communication pair of the communication control unit and the toll collection processing unit,
when a first component, which is one part configuring the communication pair, accepts the input of a predetermined confirmation signal, the first component outputs a predetermined response signal, and
a second component, which is another part configuring the communication pair, outputs the confirmation signal to the first component and determines whether the first component is operating normally based on whether the input of the response signal has been accepted, and
a number of passing vehicles per unit time changes in accordance with a time span, a radio wave receiving soundness determination unit can apply the determination reference time suitable for the number of passing vehicles and determine a soundness.

2. The toll collection system according to claim 1, wherein, in an event the second component determines that the first component is not operating normally,
the second component orders the restart of the first component.

3. The toll collection system according to claim 1, wherein, in an event the second component determines that the first component is not operating normally,
the second component outputs an abnormality signal notifying that the first component is not operating normally.

4. The toll collection system according to claim 1, wherein,
in an event the first component accepts the input of the first confirmation signal serving as the confirmation signal, the first component outputs a first response signal serving as the response signal,
the second component outputs the first confirmation signal to the first component, and determines whether the first component is operating normally based on whether the input of the first response signal has been accepted,
while in an event the second component accepts the input of a predetermined second confirmation signal, the second component further outputs a predetermined second response signal, and
the first component further outputs the second confirmation signal to the second component, and determines whether the second component is operating normally based on whether the input of the second response signal has been accepted.

5. The toll collection system according to claim 1, further comprising: a system soundness determination unit, which determines that at least one of the roadside antenna, the communication processing unit, the communication control unit, and the toll collection processing unit is not operating normally in a case where the frequency of toll collection processing executed per unit time is lower than a predetermined reference processing frequency.

6. The toll collection system according to claim 1, further comprising:
a reception strength acquisition unit for acquiring reception strength information indicating the reception strength of radio waves from the on-board device received by the roadside antenna; and
the radio wave receiving soundness determination unit for determining whether the roadside antenna is operating normally based on whether the time width, in which the reception strength of radio waves indicated in the reception strength information is lower than a predetermined reception determination threshold, continues for a predetermined determination reference time or longer.

7. The toll collection system according to claim 6, wherein the radio wave receiving soundness determination unit changes the determination reference time for each time span based on statistical data indicating an amount a vehicle is driven for each time span.

8. The toll collection system according to claim 6, further comprising: a communication processing soundness determination unit, which determines that at least one of the roadside antenna or the communication processing unit is not operating normally in a case where the reception strength of radio waves indicated in the reception strength information is the reception determination threshold or higher and the results of the communication processing have not been correctly acquired from the communication processing unit.

9. A soundness determination method for determining the soundness of a toll collection system, the toll collection system including:
- a roadside antenna which wirelessly communicates with an on-board device mounted in a vehicle;
- a communication processing unit for carrying out communication processing based on predetermined communication specifications with the on-board device via the roadside antenna;
- a communication control unit for acquiring results of communication processing from the communication processing unit and creating information for toll collection with regard to the on-board device; and
- a toll collection processing unit for accepting an input of the information for toll collection from the communication control unit and carrying out toll collection processing based on this information for the toll collection, the method comprising in any of a communication pair of the roadside antenna and the communication processing unit, a communication pair of the communication processing unit and the communication control unit, and a communication pair of the communication control unit and the toll collection processing unit, when a first component, which is one part configuring the communication pair, accepts the input of a predetermined confirmation signal, the first component outputs a predetermined response signal; and a second component, which is another part configuring the communication pair, outputs the confirmation signal to the first component and determines whether the first component is operating normally based on whether the input of the response signal has been accepted; and, a number of passing vehicles per unit time changes in accordance with a time span, a radio wave receiving soundness determination unit can apply the determination reference time suitable for the number of passing vehicles for each time spam and determine a soundness of the roadside antennas.

\* \* \* \* \*